(12) United States Patent
Hunka

(10) Patent No.: US 10,619,881 B2
(45) Date of Patent: Apr. 14, 2020

(54) SPATIAL ENVIRONMENTAL CONTROL UNIT

(71) Applicant: Robert Stephen Hunka, Oakland, CA (US)

(72) Inventor: Robert Stephen Hunka, Oakland, CA (US)

( * ) Notice: Subject to any disclaimer, the term of this patent is extended or adjusted under 35 U.S.C. 154(b) by 0 days.

(21) Appl. No.: 15/979,204

(22) Filed: May 14, 2018

(65) Prior Publication Data

US 2018/0292100 A1 Oct. 11, 2018

Related U.S. Application Data

(63) Continuation-in-part of application No. 13/694,773, filed on Jan. 3, 2013, now Pat. No. 10,001,789.

(51) Int. Cl.
*G05D 25/00* (2006.01)
*F24F 11/63* (2018.01)
(Continued)

(52) U.S. Cl.
CPC .......... *F24F 11/63* (2018.01); *F24F 11/0001* (2013.01); *F24F 11/30* (2018.01);
(Continued)

(58) Field of Classification Search
CPC ..... G04F 1/32; G04F 1/3203; G05D 23/1927; G05D 23/1928; G05D 23/193; G05D 23/1931; G05D 23/1932
USPC ........ 700/276, 277, 278, 299, 300; 165/253, 165/254; 236/1 B, 1 C; 454/239, 256; 234/44 C, 91 R, 91 D; 340/229
See application file for complete search history.

(56) References Cited

U.S. PATENT DOCUMENTS 5,291,748 A * 3/1994 Ueda ................... B60H 1/00742
236/78 D
6,997,390 B2 * 2/2006 Alles ..................... F24F 3/0442
236/49.4
(Continued)

*Primary Examiner* — William V Gilbert

(57) ABSTRACT

The goal of the Spatial Environmental Control Unit as a continuation based on the Multifunctional Environmental Control Unit is to create a user friendly accurate analysis and control of heat transfer dynamics in a spatial area that is responsive to the thermal dynamics of the area of interest and accurate to maintain an acceptable level of thermal control as environmental and human biological conditions change without requiring excessive interruptions to the user for manual adjustment. The Spatial Environmental Control Unit (SECU) makes the current norm of an "absolute" temperature control approach for thermal control and human comfort obsolete. A COMFORT "theory of relativity" will now be the new norm. The proposed dynamic process of mapping and analyzing the thermal changes rapidly within the area of interest responds to the unpredictable thermal changes in environment better than the best static or "learning" process currently available. Even though the current "learning" process for thermal control makes periodic changes based on logged user preferences as a function of time, it still controls for extended time, periods with a single static temperature set point. Basically, a series of a series of static control sequences as a function of time. The proposed Spatial Environmental Control Unit incorporates the dynamics of analyzing real time thermal changes with timely feedback from the user.

9 Claims, 21 Drawing Sheets

(51) Int. Cl.
  *F24F 11/30* (2018.01)
  *F24F 11/00* (2018.01)
  *G05D 23/19* (2006.01)
  *F24F 120/12* (2018.01)
  *F24F 110/12* (2018.01)

(52) U.S. Cl.
  CPC ..... *G05D 23/1904* (2013.01); *G05D 23/1917* (2013.01); *G05D 23/1932* (2013.01); *F24F 2011/0006* (2013.01); *F24F 2110/12* (2018.01); *F24F 2120/12* (2018.01)

(56) References Cited

U.S. PATENT DOCUMENTS

| | | | | |
|---|---|---|---|---|
| 7,163,156 | B2* | 1/2007 | Kates | F24F 11/62 |
| | | | | 236/1 B |
| 8,033,479 | B2* | 10/2011 | Kates | G05D 23/1934 |
| | | | | 236/1 B |
| 8,630,742 | B1* | 1/2014 | Stefanski | H05B 1/028 |
| | | | | 700/278 |
| 8,788,097 | B2* | 7/2014 | Drees | G05B 15/02 |
| | | | | 700/275 |
| 2006/0234621 | A1* | 10/2006 | Desrochers | F24F 3/044 |
| | | | | 454/239 |
| 2010/0163633 | A1* | 7/2010 | Barrett | F24F 13/082 |
| | | | | 236/49.3 |
| 2012/0203380 | A1* | 8/2012 | Scelzi | G01K 17/20 |
| | | | | 700/276 |
| 2013/0092364 | A1* | 4/2013 | Kumar | B60H 1/00742 |
| | | | | 165/237 |

* cited by examiner

SPATIAL ENVIRONMENTAL CONTROL UNIT

This utility patent application claims priority of
provisional application US62-670843 filed on May 13, 2018
provisional application US 62-669857 filed on May 10, 2018
provisional application US 61-631388 filed on Jan. 3, 2012

BACKGROUND OF THE INVENTION

From the early days of HVAC the focus for conditioning air for human comfort has been based on measuring temperature. From mercury thermometers to thermistors, thermocouples, RTDs, technology has advanced to refine the accuracy of temperature measurement as determined by the air temperature at a single point or averaged over an area in space. The drawbacks of a single temperature measurement in space is that the number is an absolute and fixed numerical measurement or calculation. It applies to point or a single average number within an area and is not "smart" enough to understand the variations in temperature distribution throughout the spatial area of interest and the variables in human perception of comfort in a timely fashion. The acceptability of thermal environmental level varies whether an individual wants conditions warmer or cooler than the current level. If controlling thermal comfort, individuals may prefer warmer temperatures indoors on cold days and cooler temperatures on warm days. Human biological cycles affect the hourly and daily perception of thermal comfort. Activity levels and clothing are also important factors. As energy considerations become more critical the ability to trade off clothing vs energy usage requires flexibility in convenient, timely and accurate control of thermal conditions. To satisfy the dynamic variables requires a "smarter" control of thermal conditions than the current state of the art. The proposed invention introduces the concept of relativity in thermal level refined by effectively responding to user comfort feedback.

OBJECTS AND ADVANTAGES OF THE INVENTION

The goal of the Spatial Environmental Control Unit as a continuation based on the Spatial Environmental Control Unit (application Ser. No. 13/694,773, U.S. Pat. No. 10,001,789) is to create a user friendly accurate analysis of heat transfer dynamics in a spatial area that is responsive to the thermal dynamics of the area of interest and accurate to maintain an acceptable level of thermal control as environmental and biological human conditions change without requiring excessive interruptions to the user for manual adjustment. The Spatial Environmental Control Unit (SECU) makes the current norm of an "absolute" temperature control approach for thermal control and human comfort obsolete. A COMFORT "theory of relativity" will now be the new norm. The proposed dynamic process of analyzing the thermal changes rapidly within the area of detection that responds to the unpredictable thermal changes in environment better than the best static or "learning" process currently available. Even though the current "learning" process for thermal control makes periodic changes based on logged user preferences as a function of time, it still controls for extended time periods with a single static temperature set point. Basically, a series of a series of static control sequences as a function of time. The proposed Spatial Environmental Control Unit incorporates the dynamics of analyzing real time thermal changes with timely feedback from the user.

The IMPLEMENTATION is as Follows:

The thermal heating or cooling capacity of any object in a space produces infrared energy that can be observed and measured by an infrared radiation detector. A Heat Transfer Analytical Sensor Unit (HTASU), consisting of at least one multi-spectral multi-pixel infrared sensing detector and an electronic control unit wherein each irradiance sensing cell or pixel converts the thermal radiation from an object to a change in measurable electrical property (including, but not limited to, a photo-current, a resistance, a voltage) such that the property can be read, transmitted and stored for analysis by the electronic control unit. As technology progresses, a large multi-pixel array can be used in the invention, wherein the irradiance is read and transmitted by a readout integrated circuit (ROIC) to the electronic control unit. That electrical signal is representative of the radiation level and heating or cooling potential of any object on other objects in its line of sight. The resolution of the electrical signal map of the pixels within the array will allow determination of the nature of the thermal load and heat transfer between objects in the area of detection. The resolution is a function of the number of pixels and the quality of the lens focusing the radiation and the accuracy of the infrared radiation detecting cell. The current "obsolete" state of art in environment thermal control, at best, averages some or all of the electrical signals from the infrared cells. This is better than a single point temperature sensor or multiple temperature sensors in that each pixel is a sensor but the averaging and subsequent post processing determines a temperature that represents the average temperature of objects in the area of detection. This continues the obsolete approach of temperature as an absolute measurement of desired thermal level. The proposed invention looks at the space spatially, in 2D and 3D, to better define the heat transfer between objects in the area of detection, the movement of the thermally conditioned fluid, and the thermal stratification of fluid in the environment of the user interest. Natural light visibility imaging, incorporated in the product, enhances thermal analysis and facilitates bidirectional communication with the user. Additionally, the resolution of the infrared sensor (pixel count) and the capability to analysis changes in consecutive logged images allow tracking of the conditioned fluid movement within the area of detection based on the consecutive irradiance signals communicated to the electronic control unit. The tracked thermal movement is valuable feedback on the direction and flow rate of the conditioned fluid to determine the effectiveness of the Spatial Environmental Control Unit.

Our unit will include a multi-pixel, multi-spectral infrared radiation sensor, a control unit with custom algorithm to map the thermal load distribution and the dynamic transfer of heat in the area of detection, a user interface device for feedback for calibration between the thermal load map and user comfort, an actuator to operate a flow device and the flow control device called the flow control regulator.

The most common application would be the accurate and timely control of user human comfort in an i office, room in a residential space or an outdoor spatial area.

The Control Scheme is as Follows:

Position and mount the infrared sensor in a location that allows mapping for all areas of intended usage. (Optionally) Using internal angular adjustment capability, direct the infrared and visible sensors and their adjust the lens field of view to the area of interest. Map the infrared radiation level for each pixel in line of sight of the area of interest of user thermal level requirements. (Optionally) Identify the approximate location of the focus of user interest to apply weighting factors and calculations for the best starting point for determination of ambient thermal load dynamics that affect the users' thermal requirements. The thermal load dynamics analysis include estimation of both convective heat transfer to the environment in proximity to the users' area of interest and radiation heat transfer directly between the users' area of interest and nearby thermally influential objects. Input the heating and cooling parameters in terms of heating and cooling capability, location of the flow regulator with respect to the current area of interest, and the location and the directional capability of the flow regulator. With equipment running long enough to allow environmental conditions to stabilize in the area of interest, communicate directly with the user through the user interface for authorization, identification, and current thermal satisfaction level. Also request current user input for the time frame for feedback through the user interface device while monitoring potential changes in thermal level and allowing sufficient time for the effects of the flow control regulator flow change to stabilize within the environment in the area of interest. Request current user satisfaction level with the thermal conditions and request desired changes in thermal level.

The control unit sends a signal to the actuator to adjust the flow opening of the flow regulator in the direction to improve the conditions of toward acceptable user required thermal level in the area of interest. Monitor the infrared map in the electronic control unit sequentially to identify changes that relate to the thermal effects of the changes in flow from the flow regulator on the thermal level in the area of interest.

Adhering to the user dictated time frame, request feedback through the user interface device from user about acceptability of the current thermal level. Repeat the adjustment process until user is satisfied with the thermal level in the area of interest. Develop and store the relationship between the infrared radiation map readings and comfort level of the user to extend the time frame for the user feedback to maintain acceptable thermal level control. Communicate with user based on the user input time frame to monitor any improvements or deterioration in user thermal satisfaction and make adjustments as described above.

Thermal control at location within a space is a balance between the external ambient thermal load (BTU) and the system design mechanical (BTU) capabilities. Offsetting the ambient thermal load by adjusting the mechanical thermal input allows control of spacial thermal level. The variables with any thermal measurement adds uncertainty and when you factor in human physical and psychological variables, an "absolute" temperature set point selection for control is unlikely to succeed long term.

The invention approach is to develop the thermal map of the environment for control which is updated periodically to monitor thermal changes. On the system mechanical control components we have programmed in information about their BTU capacity of the equipment under user control.

Neither the measurement of environmental conditions or the level of adjustment need to be extremely accurate because of the feedback "calibration" from the user. But these measurements must be repeatable and reliable. The user input is the critical calibration factor which puts both ambient and conditioned load information into focus as it relates to user desired thermal level. This invention approach allows achieving an acceptable thermal level quickly and will also quickly correct for significant disturbances on either the ambient load or user thermal requirement. Mapping the details of the thermal object load and its response to changes in conditioned load input using infrared radiation sensing will achieve acceptable environmental conditions in an acceptable time frame and minimize thermal oscillations. A 2D image of area will also provide valuable feedback about vertical thermal stratification which is difficult or impossible to evaluate by an other approach.

Other proposed enhancements include the following:

Multiple infrared radiation sensors are spaced to provide for development of a 3D space thermal matrix further improving analysis of the effects of convective heat transfer and radiation heat transfer based on location of objects within the area of interest.

User input device options include, but are not limited to, a mounted custom device with keypad, a hand held device with keypad that can be mounted, a cell phone with an app for communicating with the control unit, a speaker, a microphone, a computer.

A user input device, with a display that downloads a thermal image from the HTASU, optionally modified for environmental visible light sensing, wherein the screen is touch sensitive allowing the user to select a focus within the area of interest and activate thermal control within the selected area of the thermal image.

Aim a pointing beam at the focus for control within area of interest frequency that can be directed at the infrared sensor to pinpoint critical control location.

Include an optical sensor for visible light detection that can be superimposed with the infrared image to create a more photo realistic viewing capability.

Position a three dimensional thin element object in the area where the user is located wherein each small segment of the individual thin elements warms or cools and stabilizes rapidly to represent the ambient gas thermal conditions in contact with it. The infrared sensor by measuring the radiation input distribution along each segment of the thin elements can document a thermal profile of the gas in the vicinity of the user (for example, a thin screen, preferably with low emissivity, that allows gas movement to pass thru it and represents the air local thermal conditions. The screen can be printed with an image for aesthetics). Depending on the vertical and horizontal dimensions of the thin element object and its location with respect to the user, this approach would provide valuable information about the air movement and thermal stratification of the gas in the area of interest.

Incorporate additional 3D distance mapping components to provide information about the spatial dimensions and size and location of objects within the area of detection. Technology for image capture for dimensional analysis could include, but not limited to, time of flight technology and "light coding technology". Determining dimensions for the physical position of objects in the field of view enhances the accuracy of calculations for heat transfer between objects.

Include a temperature sensor measuring the temperature of the fluid flow through the flow control regulator to determine if the conditioned fluid system for thermal control is in the heating, cooling- or recirculation mode and is in the proper thermal state to improve the thermal conditions in the area of interest.

Include a humidity sensor communicating with the HTASU to provide the psychometric variable of humidity for analysis of humidity's effect the acceptability of the thermal conditions as dictated by the user.

Include an adjustable lens to change the field of view of infrared radiation sensor and the visible light sensor. If the flow regulator is a smart window or skylight, the regulator incorporates an outside air temperature and a moisture sensor (primarily rain) which communicates with the HTASU to determine the usability of the ambient outside air for thermal conditioning entering the area of thermal control.

The fluid control regulator incorporates a pressure sensor, measuring pressure and/or fluid flow within the flow control regulator, communicating with the HTASU for reporting the heat transfer capacity and providing an additional control variable to the electronic control unit.

Incorporate the ability to direct the infrared sensor area of detection mechanically or manually to target the user's desired location of comfort control. Use a GPS device (i.e. cell phone) to pinpoint the area of interest for thermal control. Incorporate an ability to change the area of detection of the infrared and visible light sensors by enabling a guide beam mounted to the infrared detector and visible light detector. Combine technologies of infrared radiation measurement, optical visible image detection, and 3D dimensional mapping of objects in the field of view to provide the most sophisticated and accurate determination of heat transfer affecting the user directed thermal conditions.

BACKGROUND SPECIFICATION DETAILS FROM APPLICATION SER. NO. 13/694,773 CLAIMED AS PRIORITY FOR THIS APPLICATION

Field of Invention

The invention relates to environment control and regulation with multifunctional capability, specifically, but not limited to, an improved intelligent variable air volume device. Additionally, this invention relates to controlling the opening/closing of windows or dampers allowing introduction of clean air from another location (i.e. ambient outside air) to maintain acceptable indoor air quality (Indoor Air Quality Control Device) and/or the introduction of air at a different temperature for thermal control (Temperature Control Device). The pressure differential producing the air flow can be driven by wind, a fan blowing into the space, or a fan blowing outward creating a negative pressure, or the buoyancy forces create by temperature difference. When the temperature of an enclosed space with a tower, venting to ambient atmospheric conditions, rises due to heat generated by occupancy, computers, other equipment, buoyancy forces create a negative pressure in the space. That negative pressure creates a pressure differential across windows or diffusers being fed by ambient atmospheric conditions or diffusers being fed by pressurized conditioned air.

The environmental control can also be implemented without the movement of air by opening/closing a Thermal Radiation Blocking Device (i.e. shades) that block or allow thermal radiation from a higher or lower temperature mass (i.e. the sun).

Additionally, the Pressure Control Assembly can be implemented as a standalone unit for installation in the system duct work to allow a balanced control of conditioned air to the individual terminal diffusers or registers supplying each zone of interest. A wireless network of communication between intelligent pressure control units and the system fan/blower would control a flow reduction or increase capability of each balancing damper optimizing energy conservation.

Energy harvesting combined with ultra-low power sensing, communication, actuation, and a control algorithm would allow wireless operation requiring only a backup battery or super capacitor when harvested energy is low or a power surge is required.

Related Art

There are many modes and methods of controlling conditioned air flow within the environment of dwellings, commercial spaces and industrial spaces. Typically an HVAC system requires a blower and heating/air conditioning control units to feed the fixed terminal registers and diffusers with sufficient thermal capacity and pressure differential to regulate temperature and air movement Uniformity of acceptable temperature distribution within an occupied space is a function of air in the optimum temperature range moving in the optimum direction with sufficient velocity. There are many methods of controlling air exiting the diffuser, from simple manually operated valves or switches to actuator/damper assemblies controlled by electronics incorporating complex control algorithms. Within an occupied space and within a location with multiple occupied spaces, there is a greatly expanding requirement for individuals to communicate with and control their environment The accuracy and efficiency of that effort improves quality of life. Technological advances and expansion incorporate devices that require a central hub where these capabilities can be coordinated and optimized.

Advantages in Thermal Control Over Prior State of the Art

Disadvantages of Prior Self-Powered Diffuser State of the Art

Performance Affected by System Pressure

Excessive aerodynamic sound limits supply pressure at diffuser to 0.3 in-H2O. Blades can "blow open" uncontrollably at supply pressure exceeding 0.5 in-H2O. Pressure related forces on the actuators create offsets in temperature control setting require adding a pressure control box or modification to standard VAV box (modified for pressure control) upstream.

Performance Affected by System Supply Air Temperature

Thermal element "wax" range needs compensation for effects of system temperature to accurately control the room temperature. Set point changes result from the influence of significant changes in supply temperature during either the heating or cooling mode.

Changeover wax actuator located near the connection to the supply duct can be driven to non functionality by very high supply temperature. Room wax actuators can be driven to non functionality by high supply temperature. Room temperature range is limited to 70 to 78 deg F. operating point. Room temperature is sensed by room air circulating at diffuser height. Some time delay is involved between temperature to be controlled at desk level and temperature sensed by controlling diffuser in the ceiling on system startup or after closing tightly due to load being satisfied or reduced under low load conditions. If the room air circulating at the ceiling to operate the controlling actuator when the primary supply air flow is low, accurate measurement of room temperature and proper control is inhibited. A similar delay in response occurs due to poor air induction movement at diffuser room element under low supply pressure conditions. After changeover between heating and cooling modes, some thermal "stabilization" time is require for standard operation.

Performance Affected by Other Mechanical Interaction

As a result of mechanical friction or wax chemistry, induced hysteresis, detrimental control dead band, as well as time delays are created. The number of parts with their related tolerances combined with "play" in the linkage for movement further amplify the dead band. Because of the use of lever arms in the assembly, high external force can act on the wax actuators and cause operational changes overtime and life expectancy deterioration. Wax actuators have internal hysteresis and must overcome the frictional and tolerance variables to achieve proper positioning. There is no position feedback to compensate for these effects. The operation of the multiple-part linkage. hinged blades for controlling air flow are sensitive to pressure drop and aerodynamic forces created by air flow.

Performance Affected by Limited Directional Control for Air Flow

Ceiling diffusers typically direct air flow horizontally along the ceiling and then downward upon hitting a wall or partition. The best Air Diffusion Performance Index (ADPI—namely, proper balance between air temperature and air velocity at numerous points in the occupied space) is achieved when a specific range of air velocity is maintained at the nearest wall. Velocity that is too low will result to temperature stratification. Velocity that is high can result in drafty conditions in the cooling mode. While cooling from the ceiling with a horizontal throw pattern is good, driving heated air along the ceiling and down a wall (particularly down a cold window) may be difficult. Partitioning individual spaces within an open office with cubicles can be difficult when adjacent ceiling diffusers compete and can over-ride each others thermal control operations.

Performance Affected by High Aerodynamic Sound and Noise

As a result of the ceiling diffuser being the modulating controller (high pressure drop at the visibly exposed blade tips), a high velocity occurs at the air discharge area of the diffuser. The acceptable sound level is subjective determination depending on other local conditions but must be controlled at an acceptable level. This requires upstream dynamic pressure control with a separate box or a modification to a standard VAV box. The sheet metal construction for the typical throttling surfaces are not perfectly straight of-in-good alignment and can create high pitch audible whistling at nearly closed conditions.

Acceptance Affected by Appearance and Aesthetics

Flatness in the outside perimeter of the diffuser is important to providing a visually continuous ceiling look. If the appearance panel, blocking the internal mechanism, is noticeably below the plane of the ceiling, the continuous look is also disrupted. Painted sheet metal, if not properly handling can be scratched requiring touch up or replacement. Colors and textures are limited for painting.

Limitations of Current Externally Powered Electronic Diffusers

Limitations of current externally powered electronic diffusers having the above thermal actuators, sensing capabilities, and mechanical linkages can be controlled electronically with microcontrollers using control algorithms with a larger number of program steps. Fine tuning, through years of empirical testing, are required to provide the proper accuracy and dynamics for full room thermal control. Unusual load changes (i.e. conference room, or intermittently occupied spaces) can produce borderline acceptable performance. Power levels required for electrically operating wax actuators virtually negate standalone (without wires) operation using energy harvesting (even with battery backup). Electronic units typically measure the temperature to be controlled with sensors located on a wall or near a desk these measurements are affected by transient conditions of room air circulation patterns. when mounted on the wall they are not a accurate representation of temperature at desk level away from the wall.

Proposed Electronic VAV Diffuser to Overcome Prior Art Limitations Energy Harvesting Operation Ultra low power electronic circuitry is capable of working from energy harvesting power sources (with battery backup). Low power actuators are used for room temperature control and supply pressure control. A damper design where the assembly is relatively flat and damper movement is perpendicular to the movement of air the device minimizes the operating forces. The iris type damper, rotating cylinder type damper, and the rolling cylinder type damper enables highly sensitive proportional control for long term operation can then be provided by an inexpensive, low power actuator. An expert control algorithm implements the understanding that controlling temperature in an open space with thermal mass and typically small hourly load changes is best controlled by small air flow adjustments combined with intelligently programmed delays. Averaged energy usage over time is greatly reduced. Ultra-low power sensing devices is incorporated for remote room temperature, supply air temperature, baffle position, system supply pressure. diffuser discharge pressure, occupancy detection for control and security, and safety functions of fire and smoke detection. Ultra-low power communicates with room components and main conditioned air system components. Energy harvesting techniques utilizes piezoelectrics, thermoelectrics, radio frequency (rt) energy, electromagnetic, and air flow fan generators. Energy harvesting power options may be further enhanced by combining real time energy harvesting with energy storage utilizing super capacitors, batteries, or hybrid capacitor/battery combination.

Intelligent Air Distribution Characteristics for Heating/Cooling in an Individual and in Open Offices Internal throttling dampers allows a combination of horizontal and vertical air flow patterns to intelligently handle office geometries (individual or an open office) under variable load conditions.

Mechanism Designed to Minimizes Detrimental Mechanical Effects

Options, whereby discharge air damper movement minimizes the effects of pressure drop on opening and closing, include: Incorporate sliding motion—whereby, for both heating and cooling, dampers move essentially perpendicular to the pressure drop creating the air flow to minimize or eliminate any offset or blow open effects. Incorporate rotating motion—whereby individual dampers (possibly cylinders) rotate on a centrally located axis exposing open areas for air flow. Incorporate rolling motion—whereby—dampers (possibly cylinders) roll translationally out of a sealing area to expose open area for air flow.

In the case of the opening/closing of a smart window where weight and alignment are more significant than the effects of pressure drop, the intelligent drive mechanism would be attached to an opening window (I.e. Awning, casement) from another manufacturer, modified to accept the proposed mechanism. Internal supply. pressure baffles for_diffuser_discharge pressure control or reduce the pressure drop across the thermal control baffles minimizing frictional effects producing hysteresis and reducing noise. A diffuser supplying air to a space with very low load requirements needs to shut off tightly to maintain temperature set point and minimize unnecessary system energy usage. The proposed supply pressure control mechanism is positioned in a smaller, non-visible area of the diffuser where a tight shut off is more easily achieved. The control algorithm is written so that when the temperature in the space is satisfied and temperature control damper is at its closed position, the supply pressure control function would be overridden and the supply damper will close more tightly. Actuators for room air control and diffuser discharge pressure control operate with negligible hysteresis and nearly instant response. Possible technologies for actuation include piezo-electric, small efficient motors, enhanced bi-metal, enhanced memory metal, linear transducers. A much more efficient and streamlined universal intelligent control algorithm is enabled by state of the art sensing modules and low hysteresis, precision actuators with position feedback.

Multiple Diffuser Communicating for Integrated System Control

Incorporate complete system balancing—whereby all diffusers communicate with each other allowing the control logic in each diffuser to adjust individual internal system baffles to properly distribute conditioned air to the diffusers responsible for each occupied space as a function of their individual load requirements.

Additional control logic in each diffuser provides fail safe damper closure on smoke detection, fire detection, or loss of power. Control logic incorporates state of the art mechanical system components with advanced energy conservation principles. Reprogramming for design improvements would be enabled by easily mastered human interface commands. An integrated universal intelligent control algorithm makes decisions based on weighting factors for 1) controlling the ADPI (air diffusion performance index—the relationship between air temperature and air velocity for comfort in the occupied space), whether in an open office, conference room, interior office or outer perimeter office (under heating or cooling conditions) and 2) over-riding for security, safety and 3) employing energy conservation factors based on optimum time response intervals and 4) System balancing to compensate for duct configurations and 5) system blower control for energy, durability, and maintenance.

Improved Aesthetics for Architects and Occupants

Housing and internal parts use smoke and fire rated plastic. Production process is selected for producing rigid, flat, durable, color-thru (paintable) parts to minimize weights and maximize customization for architectural preferences. Exposed face of the controlling diffuser is positioned visibly flush with surrounding ceiling. features. Openings for required air flow are minimized to provide only sufficient area for load requirements. Appearance is virtually flat when closed during low or no load requirements. Sound absorption techniques reduce aerodynamic noise allowing operation at higher pressure levels (which maintain proper air circulation in larger rooms or under low load conditions where primary air volume is reduced but high air velocity is required for good air circulation).

Advantages of Integral Infrared Temperature Sensing

Mounting an infrared temperature sensor in the diffuser allows an unobstructed direct view of the thermal properties of all objects in its built in angle of detection. The angle of detection can be factory fixed or constructed for field adjustment. The field adjustment can be achieved by manually swiveling the sensor to direct toward a particular area or, in the case of a multi-pixel sensor, selecting the pixels for action that represents the areas of interest. (Relatively inexpensive uncooled infrared sensor displays have been developed, (i.e. Calsensor scd-15 and Panasonic Grid-Eye). Infrared temperature sensing of an area of interest allows a more stable determination of the thermal conditions within that area and is not effected by transient air movement in the area of interest. Effectively, the infrared sensor is averaging the ambient temperature over time and over the area of interest. From an energy conservation and energy harvesting standpoint, the controls are less subject to cycling on and off. Conditioned air is provided to meet the true stabilized needs of the space. The actuator does not need to make adjustments as often and as large so the energy used over time for dampering is minimized allowing energy harvesting to more fully satisfy those requirements. The output of a multi-pixel array broadcast wirelessly to a display or computer would allow the occupant to select the pixels of interest for the control algorithm. Infrared sensing in addition to object surface temperature measurement will also be responding to thermal mass loads. The greater the heat capacity of a hot or cold object, the slower its response is to diffused conditioned air. The sensor will respond to the environment similar to the way people will feel heat when standing near a hot or cold object. Another advantage of the infrared temperature sensor and any of a number of other analog output sensors (including the proposed pressure differential sensor) is to utilize a pulse width modulated output where the output is proportional to the sensed temperature. With RC type electronic filtering, a wave type analog signal is produced. the amplitude and period of the signal can be fine tuned to create a "soft" opening/closing of the device when integrated with an intelligent control algorithm. Modern control algorithms are based on complex variables, i.e. PID control, which are not efficient or necessarily appropriate for room temperature control in a HVAC system where movement of conditioned air where circulation patterns are time dependent and where temperature changes are moderated due to the thermal mass and other heat sources and heat sinks in the area of interest. Our simple approach minimizes computational time and energy increasing the ability to function with energy harvesting power source.

Temperature changes are moderated due to the thermal mass and other heat sources and heat sinks in the area of interest. Our simple approach minimizes computational time and energy increasing the ability to function with energy harvesting power sources.

Advantages in Stand Alone System Pressure Balancing Unit Over Prior State of the Art After hvac installation in new construction or a significant modification to an existing design, a considerable amount of time and money is spent in manually adjusting the numerous balancing dampers to allow sufficient air flow to each conditioned one. This money is spent in manually adjusting the numerous balancing dampers to allow sufficient air flow to each conditioned one. This activity is guided by a design parameters calculated by engineering based se on estimated space usage. If this initial estimate is incorrect, overly conservative or optimistic, for or if the intended usage changes, then the costly process of manual balancing must be performed again. If additional spaces are added or activated, manual balancing must be redone. In any case, the settings are static between adjustments and are successful only as an average over time and cannot automatically change with the intermediate cycles that occur on a daily basis.

Proposed Intelligent Balancing Damper to Overcome Prior Art Limitations

The intelligent balancing damper would incorporate a pressure/differential pressure sensing element, a low power actuator, a throttling mechanism to restrict air flow, an intelligent control algorithm to implement pressure balancing to satisfy area requirements with energy conservation considerations given a high priority. Communication between pressure balancing units and with the central fan/blower would allow dynamic adjustments nearly instantaneously. Outcome would enable optimum dynamic control while minimizing energy usage.

Intelligent Window/Shutter—a New Device for Thermal Comfort or Pressure Differential Control Even though an operable window or shutter is not normally considered as a diffuser for thermal comfort control, in a broad sense, it is covered under this application. A "diffuser" is a device that directs air into a space. this application covers intelligently controlled "diffusers" that delivered thermally conditioned air driven by a pressure differential produce by external sources. in the case of an operable window or shutter as an intelligent "diffuser" the pressure differential between external ambient conditions and internal conditions can be produced by ambient wind. Creating a positive pressure with respect to internal conditions, or a fan at this window or shutter in another external location blowing out to create a negative pressure in the internal space. The temperature difference is developed by the external temperature (for example, early morning cooler temperatures) available to cool an internal space heated by combination of occupancy, lighting, electronics, and solar thermal radiation transmitted through a glass area. A temperature sensor, particularly, an infrared temperature sensor, directed toward objects near the window or shutter, would remotely measure the average temperature of the objects in its field of view, and through the intelligence built in the control algorithm supplemented by "set point" input by occupants of interest, open or close the window or shutter in an optimally controlled actuation. Currently, high cost are incurred on startup of a newly installed HVAC system as a result on the cost of labor of manually adjusting each balancing damper in an iterative manner. subsequently, future manual readjustments are required upon expansion, contraction, or realignment of the occupied zones.

The Intelligent Window/Shutter/Diffuser Approach is not Limited to HVAC System, or Outside (Ambient) to Inside (Occupied) Applications Any two adjacent enclosed area in immediate contact or connected by channels or ductwork can be balanced thermally or by pressure differential by sensing the temperature in the different enclosed areas and opening and closing the window/shutter/diffuser based on the intelligent control algorithm supplemented by the a "set point" input by occupants of interest. The simplicity, cost effectiveness, and accuracy of the sensor combined with a simple but responsive control algorithm would accomplish our goal of high value for numerous applications. for example, This approach could be used for cooling large scale electronic storage "farms" where the pressure difference for "cooling" air flow is driven by air. heated by the sun in a solar structure. rises by buoyancy through a single or multiplicity of vertical tubes exhausting to ambient conditions.

BRIEF SUMMARY

The invention provides for, according to one general embodiment, a novel cost effective smart or intelligent HVAC diffuser. It is general realized that individual diffuser control is better than VAV boxes. We propose an electronically controlled diffuser incorporating computer technology and algorithms overcoming the limitations of wax encapsulated thermal actuators Stand-alone (not requiring a wired power source) capability operates from energy provided by energy harvesting components and backed up with energy storage components (battery, super capacitor). The invention provides for, according to another embodiment, a novel cost effective smart or intelligent window/shutters/damper. The device incorporates an integral sensor that measures temperature in a remote location and opens or closes the window/shutter/damper to satisfy the goals of the embedded control algorithm. Stand-alone (not requiring a wired power source) capability operates from energy provided by energy harvesting components and backed up with energy storage components (battery, super capacitor). The invention provides for, according to another embodiment, a novel cost effective pressure or differential pressure damper. The assembly minimizes the detrimental effects of high pressure drop and aerodynamic forces. The device incorporates a low cost sensor which measures differential pressure and opens or closes a damper to satisfy the goals of an imbedded control algorithm. The device would work as a standalone unit or wirelessly communicate with other similar devices to create a highly integrated, energy efficient ducted system. Power to operate all functions is provided by energy harvesting components and backed up with energy storage components (battery, super capacitor). Other aspects and advantages of the present invention will become apparent from the following detailed description which when taken in conjunction with the drawings, illustrates by way of example the principles and structure of the invention.

BRIEF DESCRIPTION OF THE DRAWINGS

Taking the following specifications in conjunction with the accompanying drawings will cause the invention to be better understood regarding these and other features and advantages. The specifications reference the annexed drawings: wherein:

FIG. 10 B is the second drawing of two describing the schematic of the control algorithm for the sensitivity of the air diffuser housing assembly air diffuser housing assembly

DETAILED DESCRIPTION OF THE PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

Figure 1:
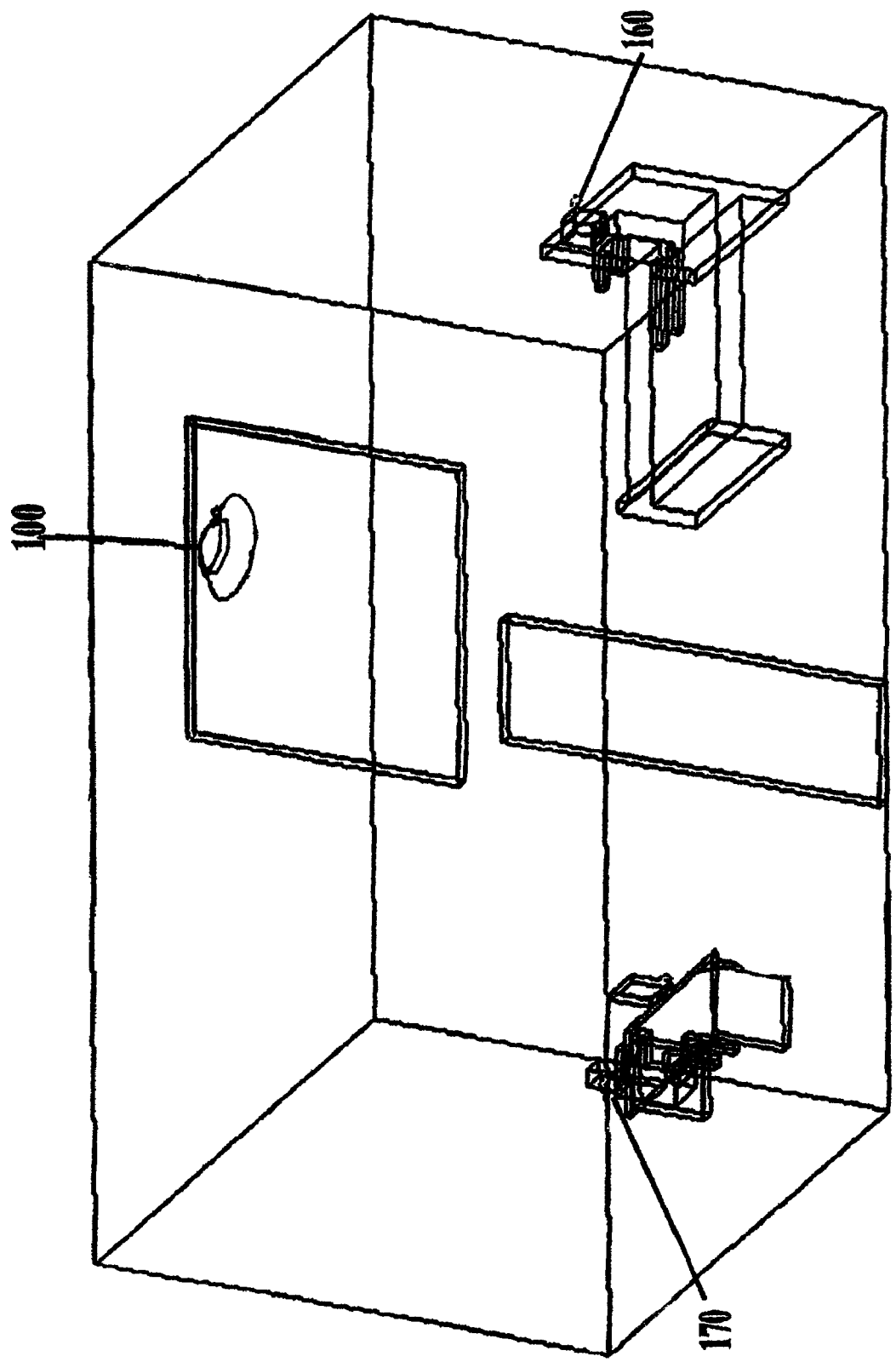
FIG. 1 is a perspective view of a spatial area showing typical user locations.

Now referring to FIG. 1 which discloses a preferred embodiment of the present invention, an air diffuser housing assembly generally referenced by numeral 100 which is depicted in a closed environment, such as a room or office wherein the unit 100 has the functionality of the following, it can sense external and internal properties, such as temperature, pressure, and position, and control the movement of conditioned air for thermal control, Occupants, referenced by numerals 170 and 160, will benefit from the multifunctional capabilities of the an air diffuser housing assembly.

Figure 2:
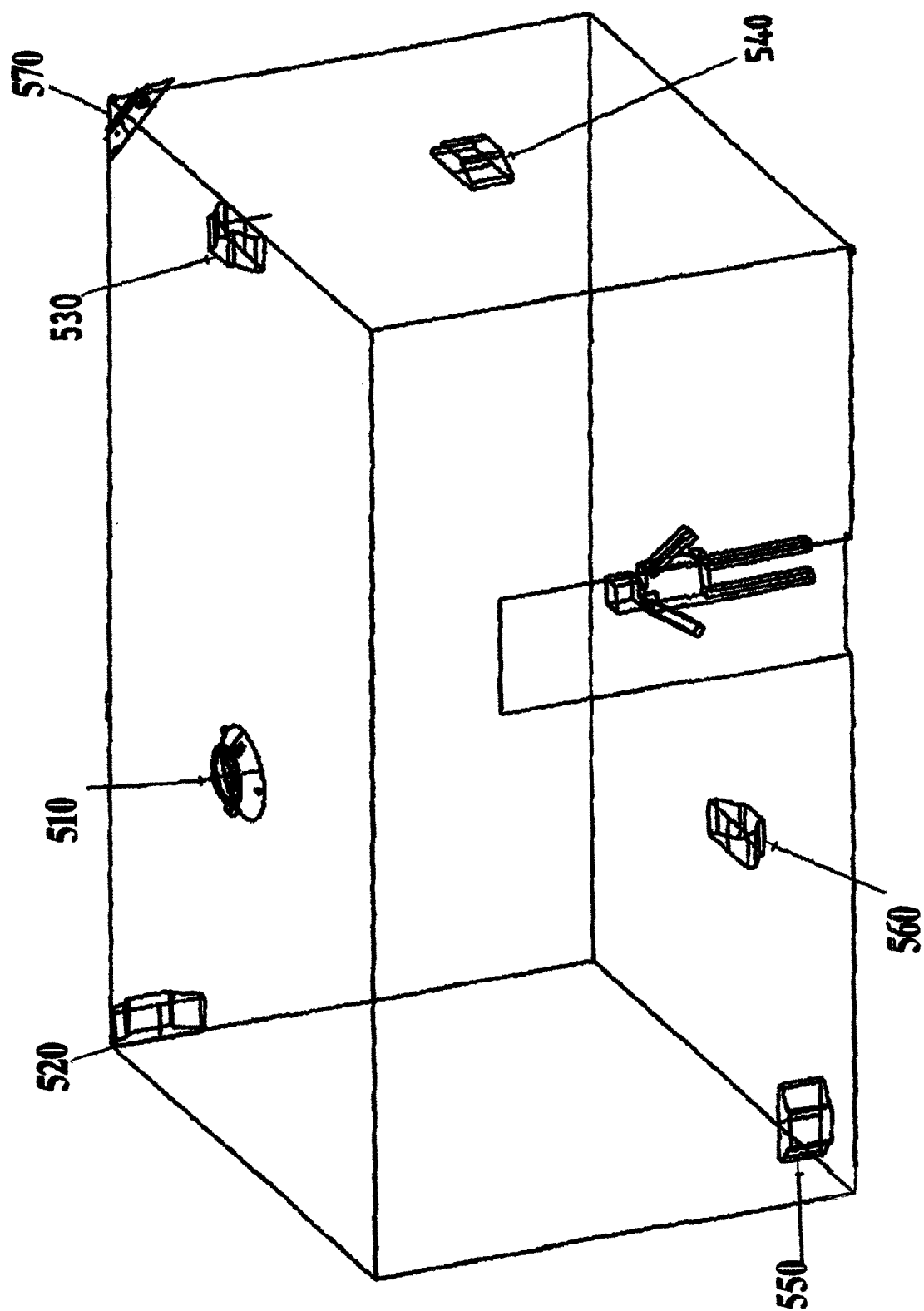
FIG. 2 is a perspective view of other occupied space locations for the air diffuser housing assembly enabling the multifunctional capabilities utilizing "iris" type damper assemblies.

Now referring to FIG. 2 which discloses optional locations for the controlling unit. Optional locations for controlling unit include centrally located in the ceiling referenced by numeral 510, at the ceiling/wall corner along a long wall in a rectangular room referenced by numeral 520, at the wall referenced by numeral 540, at a wall referenced by numeral 550, at a ceiling/wall corner along a short wall referenced by numeral 530, and at a under floor location referenced by numeral 560

Figure 3:
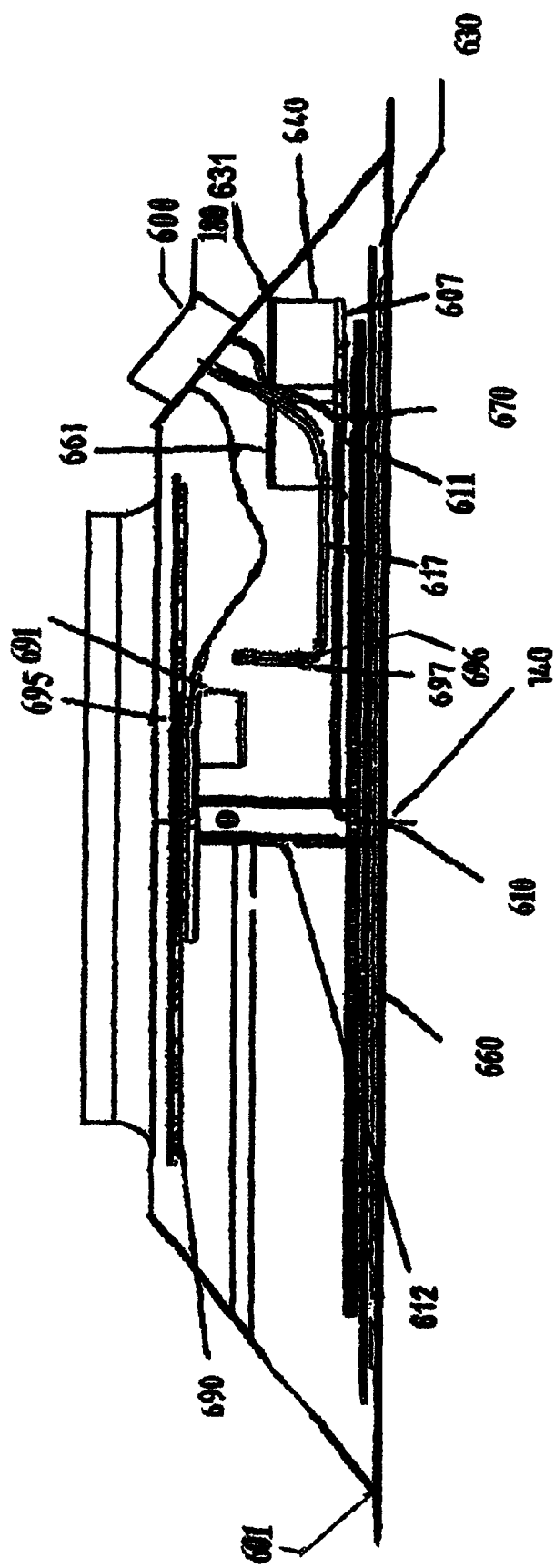
FIG. 3 is a perspective view of the best implementation of the air diffuser housing assembly.

Now referring to FIG. 3 which discloses the one possible internal construction of the controlling unit which embodies the improvement capabilities described above. Internal components include an internal sensing element for occupied space detection and communication referenced by numeral 140, and an infrared sensor for measurement of external environmental thermal conditions referenced by numeral 610, and system supply communication 180, a movable horizontal air flow baffle assembly referenced by numeral 630, an actuator for positioning the movable horizontal air flow baffle assembly 630 referenced by numeral 640, a movable vertical air flow baffle assembly referenced by numeral 660, an actuator for positioning the movable vertical air flow baffle assembly 660 referenced by numeral 670, a moveable supply pressure baffle assembly referenced by 690, a supply pressure actuator to position the moveable supply pressure baffle assembly 690 referenced by 695, an internal supply air temperature sensor referenced by numeral 696, an internal pressure sensor referenced by numeral 697 with a tube referenced by numeral 617 to communicate internal pressure to the pressure sensor 697, a position sensor for the movable horizontal air flow baffle assembly 630 referenced by numeral 631, a position sensor for the movable air flow baffle assembly 660 referenced by numeral 661, a position sensor for the moveable supply pressure baffle assembly 690 referenced by numeral 691, a housing for the electronic control unit referenced by numeral 600, and a lower face plate for the controlling unit referenced by numeral 607, an arm referenced by numeral 611 attached to actuator 670 to drive a post referenced by numeral 612 and the housing for the complete air diffuser housing assembly referenced by numeral 601.

Figure 4:
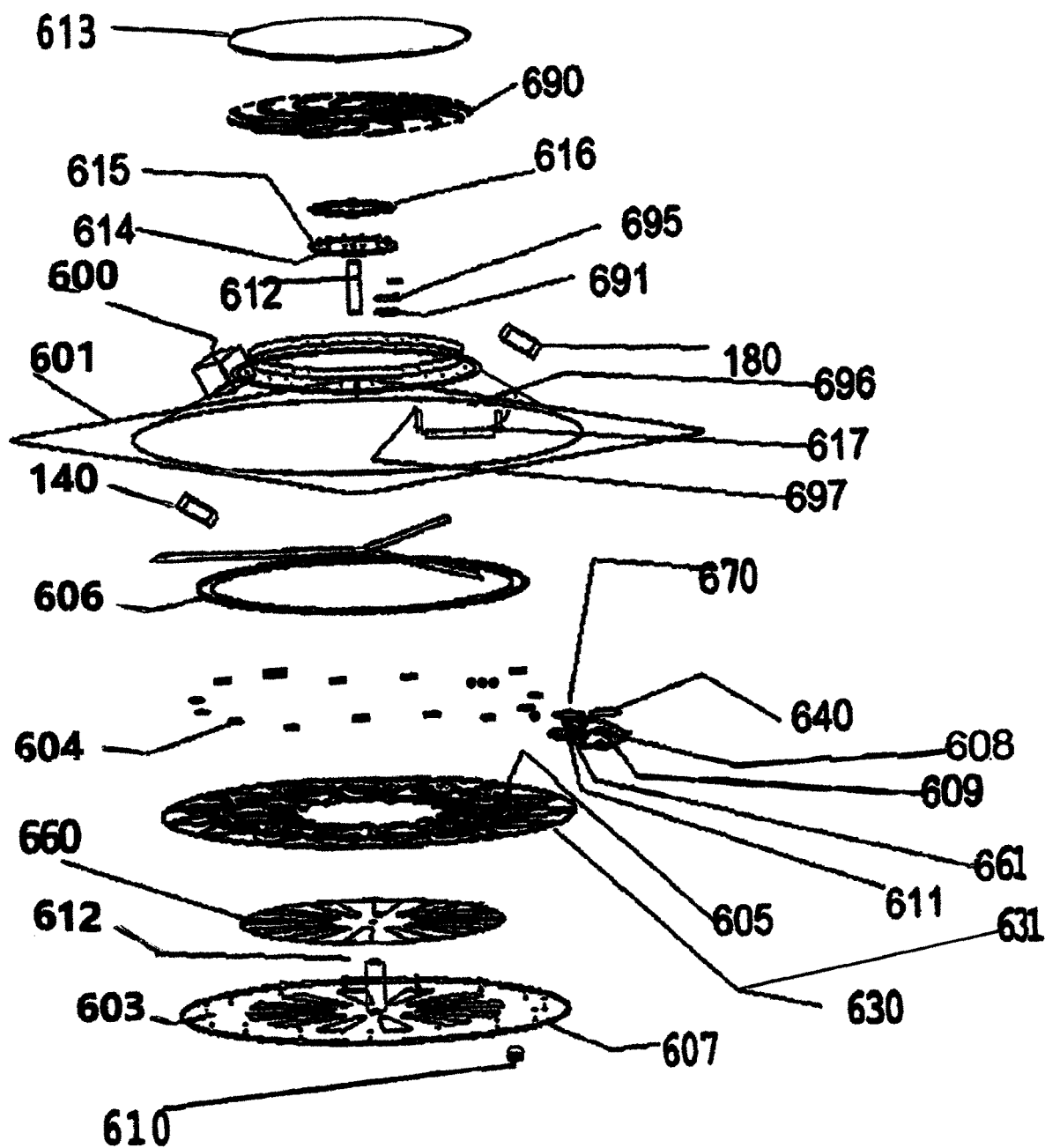
FIG. 4 is an exploded perspective view of the best implementation of the "iris" air diffuser housing assembly.

Now referring to FIG. 4, which further discloses a more detailed exploded view of the control unit depicted in FIG. 3. Components are referenced by numerals 140,180,600, 601,607,610,611,61f,617,630,631,640,660,661,670,690, 691,695,696,697. Additional components include bearings referenced by numeral 604 under each movable wings of the moveable horizontal air flow baffle assembly 630, posts referenced by numeral 603 guiding the horizontal air flow baffle assembly 630 and bearings 604, a rotating plate referenced by numeral 606 with attached pins referenced by numeral 605 whereby the pins engage slots in the moveable horizontal baffle wings 630 to rotate them thereby exposing a flow gap between the housing 601, an actuator mounting plate referenced by numeral 608 to support actuators 640 and 670, a cam like drive mechanism referenced by numeral 609 attached to actuator 640 to rotate the rotating plate 606, a, arm referenced by numeral 611 attached to actuator 670 to drive a pin referenced by numeral 612 attached to vertical moving baffle 660 thereby exposing a flow gap between the fixed plate 607 and moveable vertical air flow baffle assembly 660, posts referenced by numeral 612 mounting the complete moveable horizontal and moveable vertical air flow baffle assembly to the housing 601, a gas impermeable flexible fabric referenced by numeral 613 to block the internal supply air upon actuation of the internal supply pressure baffle assembly 690, a fixed support plate referenced by numeral 614 with attached pins referenced by numeral 615 to guide the bearings referenced by numeral 616 and the individual arms of internal supply pressure baffle assembly 690, an internal pressure sensing tube referenced by numeral 617 to communicate internal static pressure to internal pressure sensor 697.

Figure 5:
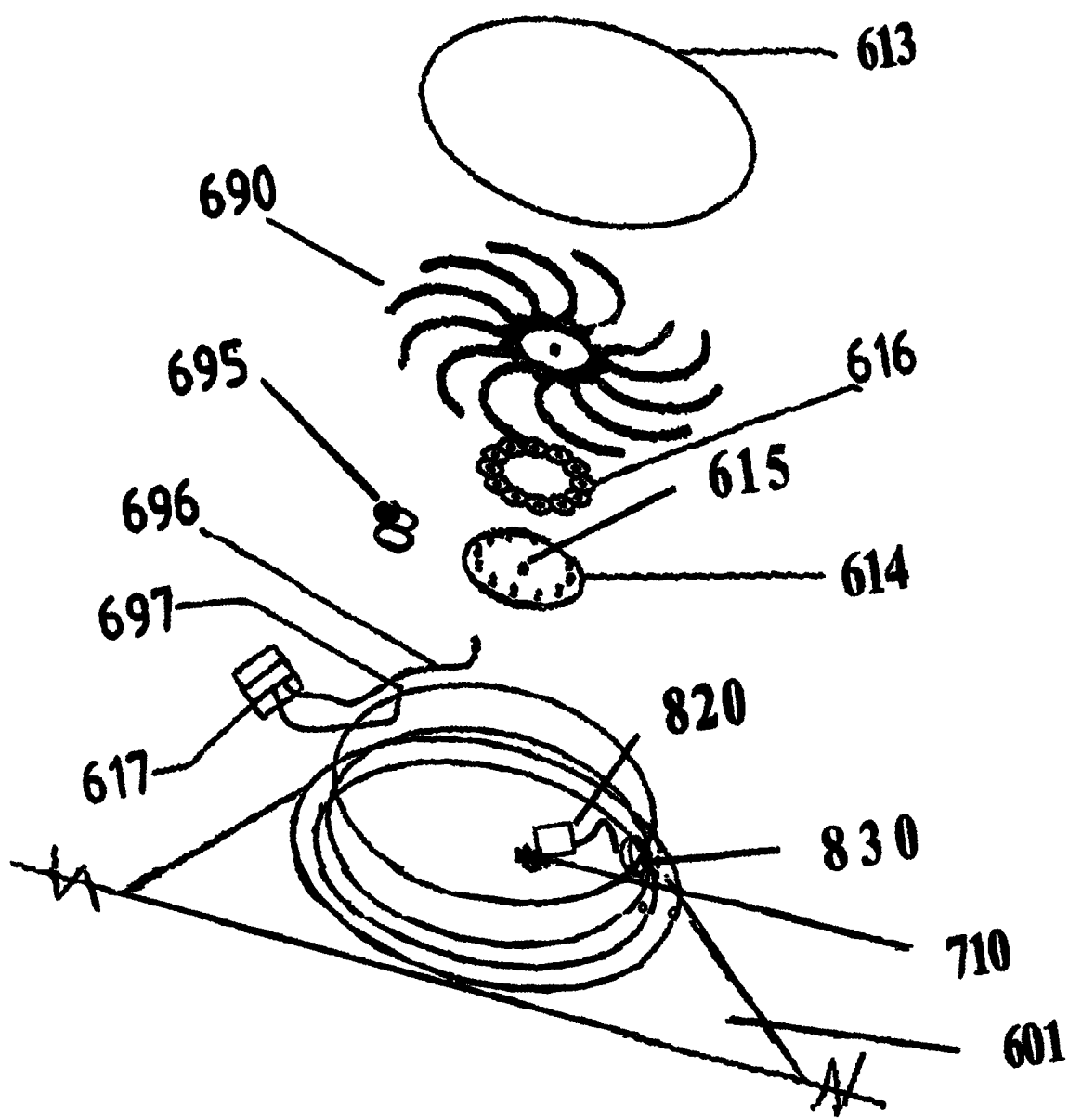
FIG. 5 is a more detailed view of "iris" type moveable baffle approach for supply pressure control and energy scavenging components in the air diffuser housing assembly.

Now referring to FIG. 5 which further discloses an explode view of the components on the supply side of the controlling unit depicted in FIG. 4. Components are referenced by numerals 613,614,615,616,617. The housing 601 is shown below the internal supply pressure baffle assembly 690. Above is also shown a small turbine blade assemble referenced by numeral 710 used to generate energy to operate the controls and supply storage energy for future use. The power to drive the turbine is extracted from the energy in the air flow supplied by the system blower upstream. Also shown are components for energy harvesting related to piezoelectric vibration as referenced by numeral 820 and thermoelectric power generation referenced by numeral 830. and Also shown are internal supply air temperature sensor referenced by numeral 696, and internal pressure sensor referenced by numeral 697.

Figure 6:
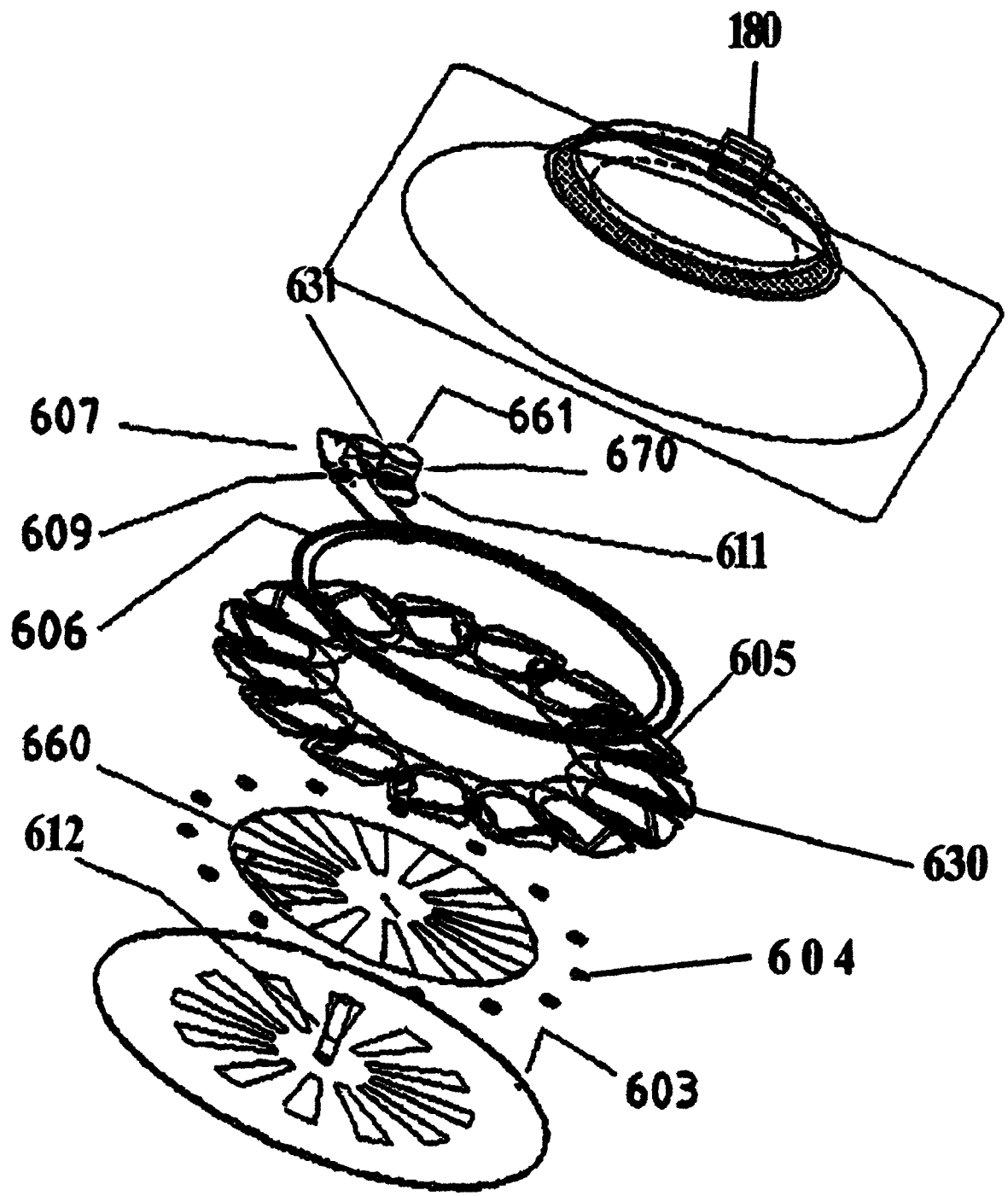
FIG. 6 is a more detailed view of "iris" type moveable baffle approach for room thermal control operation

Now referring to FIG. 6 which discloses as a further exploded view of the room temperature control assembly depicted in FIG. 3 and FIG. 4. Components are referenced by numerals 180,603,604,605,606,607,609,611,612,630, 631,660,661,670.

Figure 7:
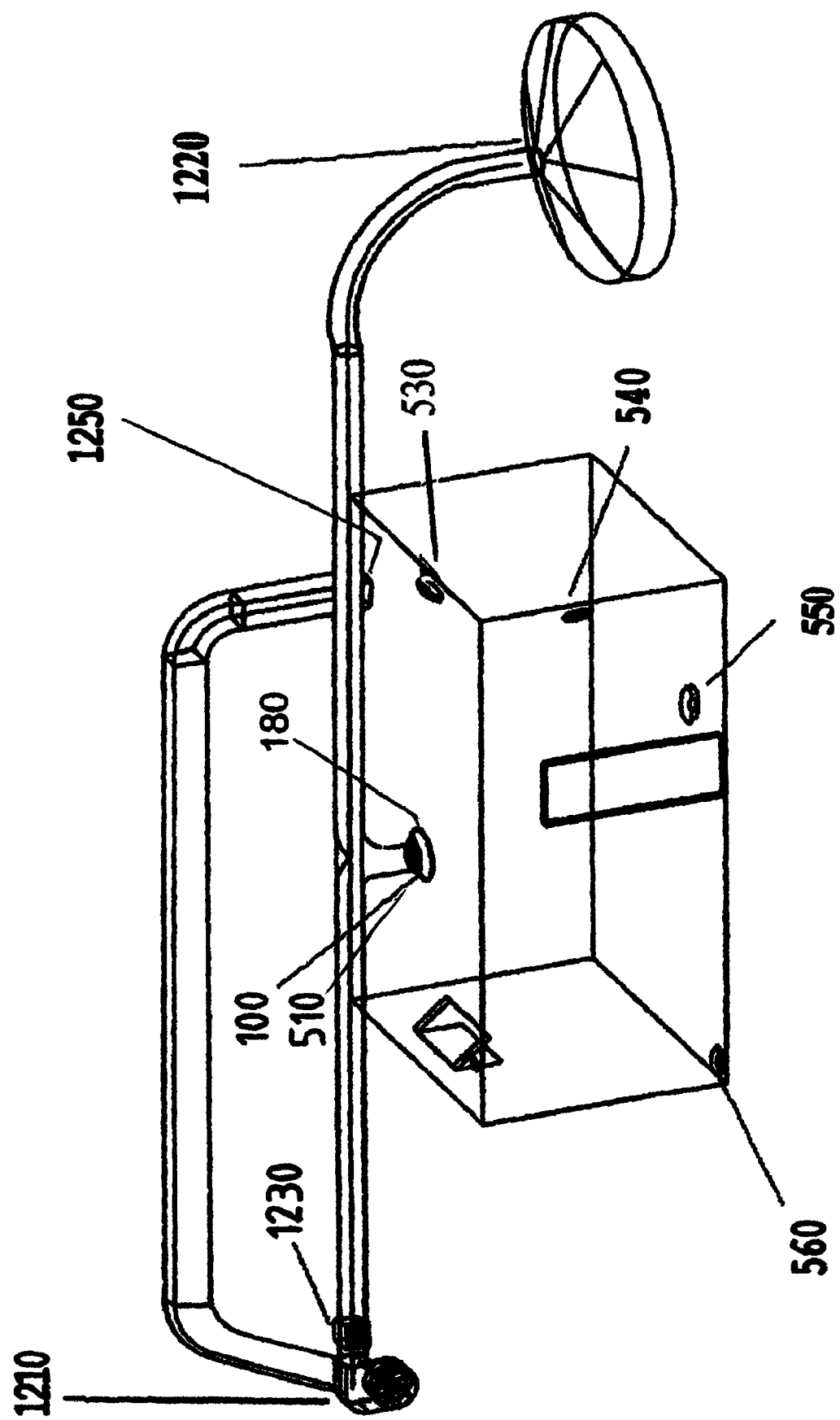
FIG. 7 is a perspective view of a complete HVAC System.

Now referring to FIG. 7, which discloses the components of the system providing the conditioned air to thermally control the occupied space. Two possible sources of conditioned air, whether working in parallel or independently, are an electrically powered blower as referenced by numeral 1210 and a solar collector structure producing solar heated air moved mechanical with a blower or hydronic water flow system and by natural buoyancy forces as referenced by numeral 1220. The blower referenced by numeral 1210 when feeding through a heating/cooling chamber referenced by numeral 1230 can produce the temperature and pressure of condition for the proposed air diffuser housing assembly referenced by numeral 100. Wireless or wired communication between the air diffuser housing assembly referenced by numeral 100 and electronic modules on the blower and heating/cooling unit as referenced by numerals 180 allow the energy conservation algorithm in the air diffuser housing assembly referenced by numeral 100 to optimized performance. The operation of the solar collector referenced by numeral 1220 for heating/ventilation/ventilation cooling with ductwork and dampers controlled by the energy conservation algorithm in the controlling unit 100 is covered in detail in patent application Ser. No. 13/230,835. Alternate locations for the controlling unit are referenced by numerals 510,560,530,540,550. The return air diffuser allowing air passage back to the system blower referenced by numeral 1210 is referenced by numeral 1250.

Figure 8A:
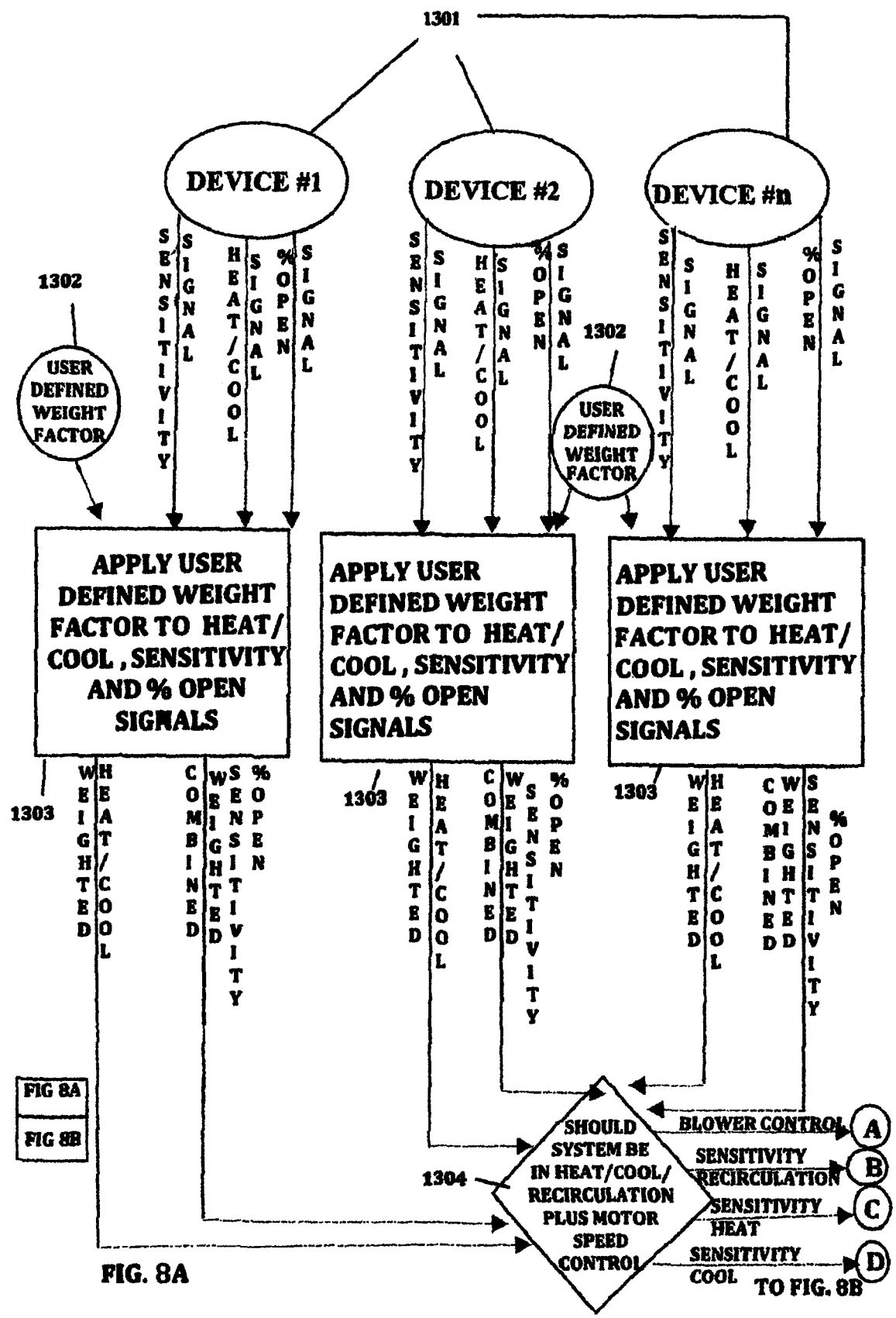
FIG. 8A is is first drawing of two describing the schematic of the control functions for a complete HVAC System.
Figure 8B:
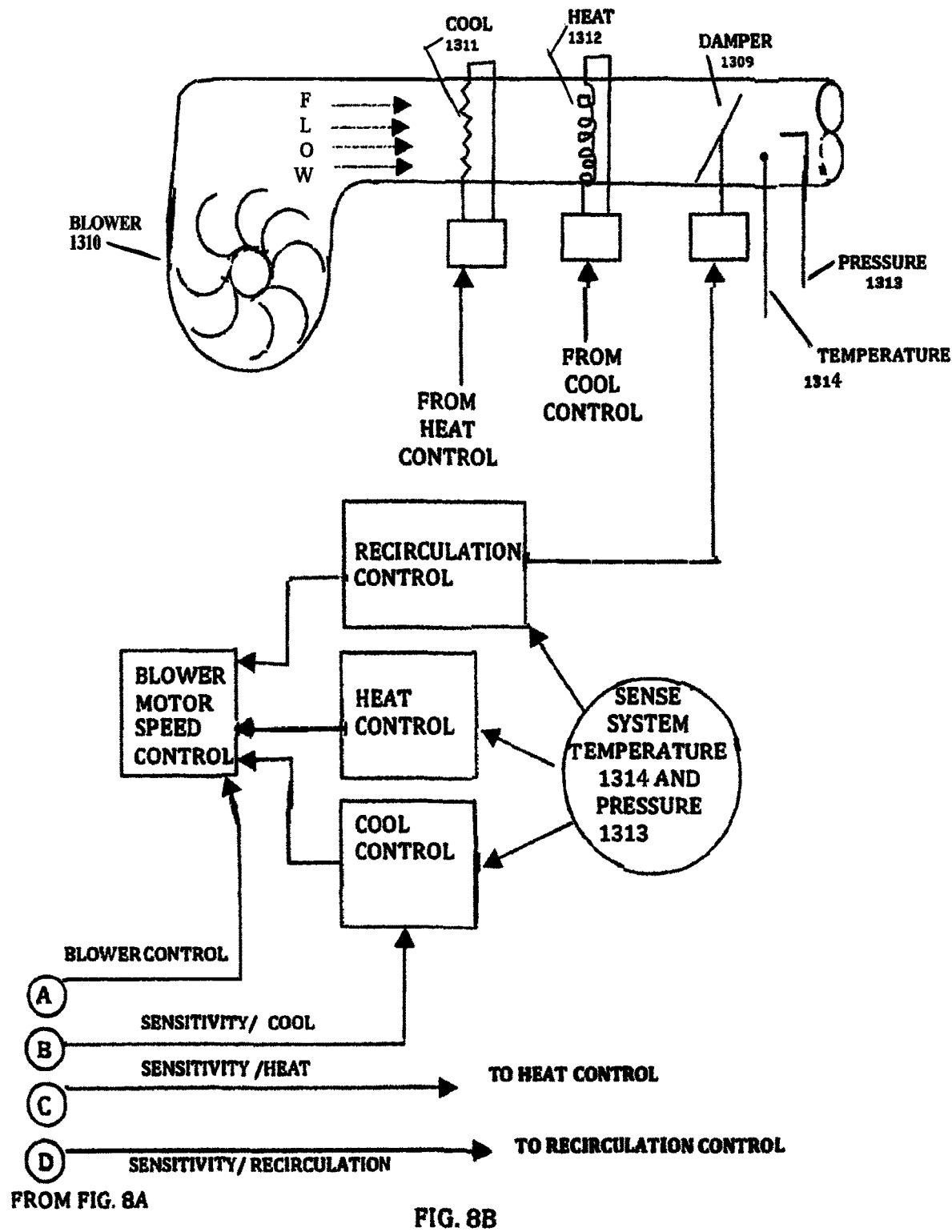
FIG. 8B is is second drawing of two describing the schematic of the control functions for a complete HVAC System.

Now referring to FIG. 8A and FIG. 8B which discloses a schematic for the completed system outlining the logic applied to the individual components for optimum energy efficiency control. Signals are received from a multitude of air diffuser housing assemblies described in FIG. 1-7 as referenced by process numeral 1301. User input information is received to "weight" the value of each air diffuser housing assembly referenced by numeral 1301 as to its effect on the operation of the system cooling unit referenced by numeral 1311, the system heating unit referenced by numeral 1312, the system refrigeration unit referenced by numeral 1305, the blower motor control referenced by numeral 1310, and the damper control referenced by numeral 1309. The system control algorithm applies the weight factors from the user input referenced by process step numeral 1302 and air diffuser housing assemblies numeral 1301 as referenced by process step numeral 1303 and determines if the system should be in heating, cooling, or recirculation referenced by numeral 1305 and the speed of the blower motor referenced by 1310, and the position of the system flow control damper referenced by 1309 as referenced by process control step numeral 1304. As a function of the user input referenced by numeral 1302 the system can be utilized to maximize comfort while minimizing energy usage. System operation sensor feedback is provided by pressure sensor referenced by numeral 1313 and temperature sensor referenced by numeral 1314. This "just enough on time' concept is enabled as a result of detailed feedback from each air diffuser housing assembly detailed in FIG. 1-7.

Figure 9A:
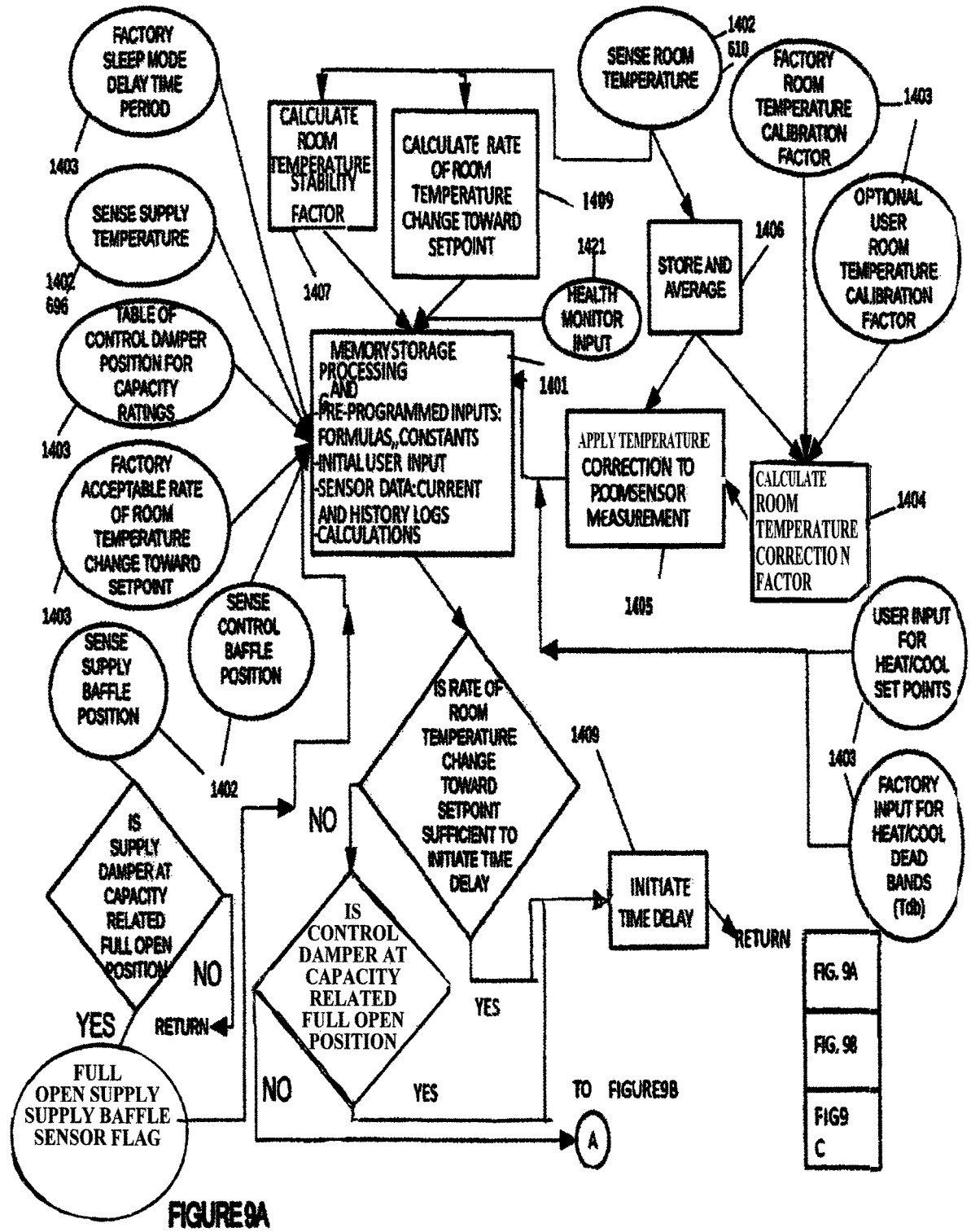
FIG. 9A is the first drawing of three describing the schematic of the control algorithm for the thermal environment control.
Figure 9B:
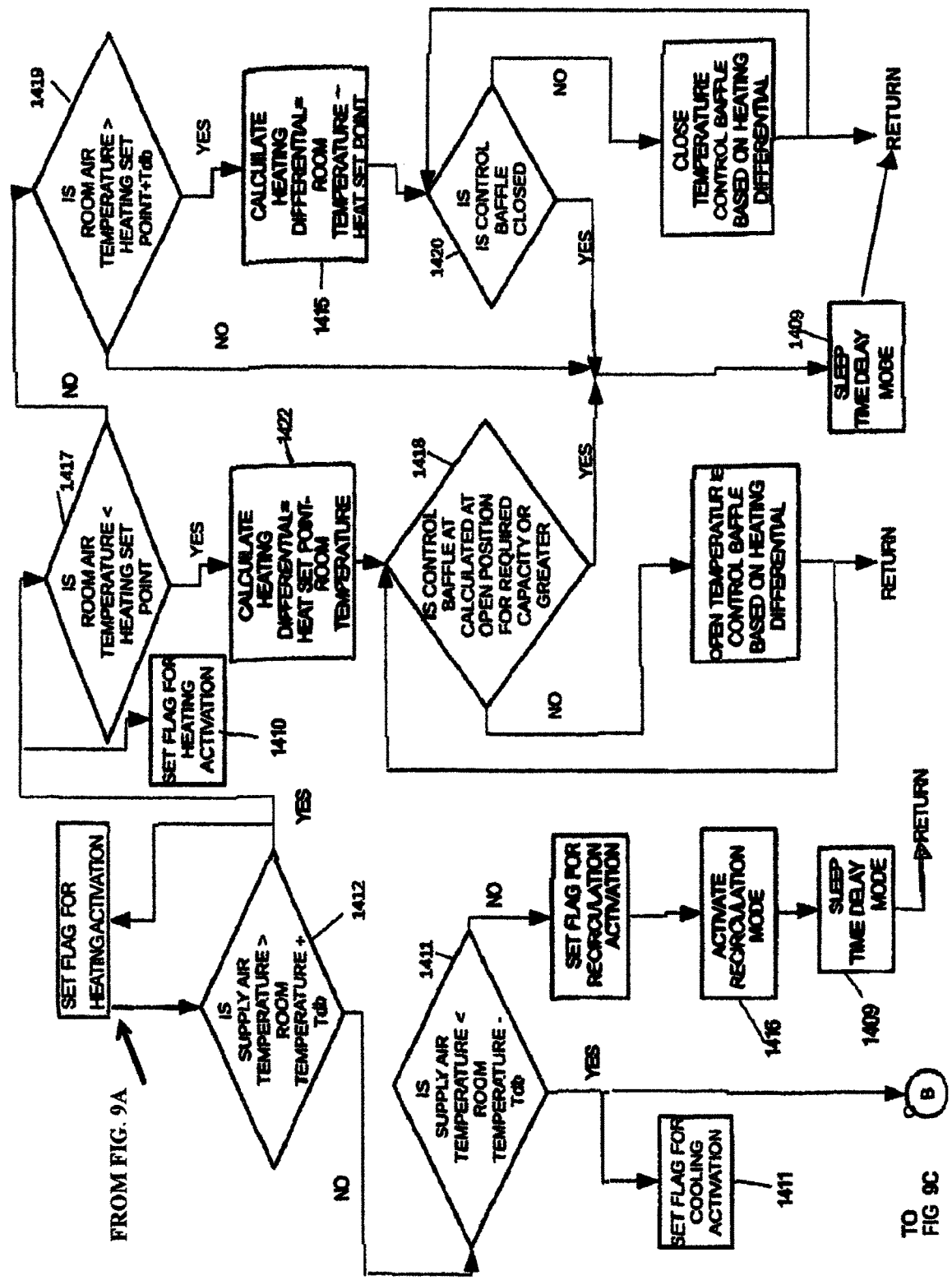
FIG. 9B is the first drawing of three describing the schematic of the control algorithm for the thermal environment control.
Figure 9C:
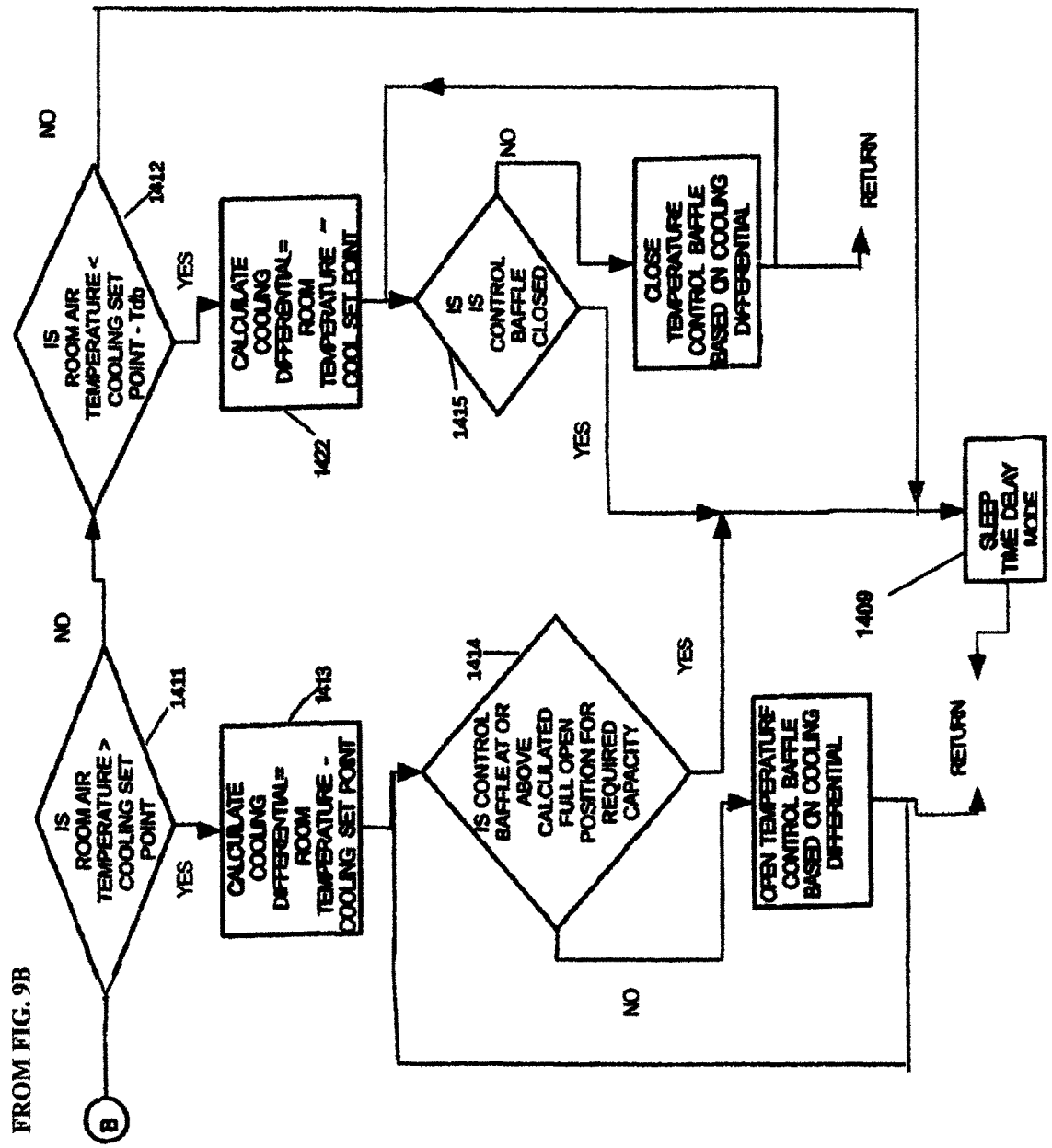
FIG. 9C is the second drawing of three describing the schematic of the control algorithm for the thermal environment control.

Now referring to FIG. 9A and FIG. 9B and FIG. 9C which discloses the logic for the temperature control of the occupied space environmental control system. The algorithm is stored in an integrated circuit referenced by numeral 1401 that receives the dynamic sensor inputs during the control operation referenced by numeral 1402 and receives the fixed calibration inputs, whether factory default or e user determined, referenced by numeral 1403. The algorithm applies the correction factors to the current measurement from infrared sensor referenced by numeral 610 in FIG. 3 in process steps referenced by numerals 1404, 1405 and 1406. The algorithm stores each consecutive temperature sensor reading from the room temperature infrared sensor referenced by numeral 610 in FIG. 3 and supply air temperature sensor referenced by numeral 696 in FIG. 3. The logical steps based on the algorithm follows the process steps referenced by numerals 1409-1422. The next step, after storing the factory and user input, is to determine a time delay period during which the electronics within the enclosure referenced by numeral 600 powers down to minimum and no signal is sent to actuators referenced by process numerals 1414, 1415, 1418 and 1420 when actuator can no longer change position of control baffle in the desired direction if the baffle is fully open or fully closed. Each process cycle indexes a counter in the registry for number of cycles in the cooling mode as determined by process numeral 1411 or the heating mode determined by process numeral 1412 or the recirculation mode referenced by process numeral 1416. The duration of consecutive cycles in each mode dictates the time delay initiated in process numeral a. An exception to the complete electronics power down during the time delay is initiated in medical applications. A health monitor sensor would send a wireless signal to the wireless receiving unit numeral 140 more frequently for critical life monitoring referenced by process numeral

1421. After the time delay has expired, the algorithm determines if the system temperature is above the room temperature by a specified amount initiating the heating mode referenced by process numeral 1410, if the supply temperature is below room temperature by a specified amount initiating the cooling mode referenced by process numeral 1411, or if the supply temperature if within the plus and minus dead band (Tdb) around the room temperature initiating the recirculation mode referenced by process numeral 1416. Typically, but not exclusively, in the heating mode numeral 1410, a signal is sent to actuator numeral 640 to close the moveable horizontal air flow baffle referenced by numeral 630. Similarly, in the cooling mode numeral 1411, a signal is sent to actuator numeral 670 to close the moveable vertical air flow baffle assembly referenced by numeral 660. In the cooling mode operation, if the room temperature is greater the cooling set point and the temperature control baffle is in an intermediate position between full open and full closed, an opening signal is sent to the actuator numeral 640 in accordance with process numerals 1413 and 1414. In the heating mode operation, if the room temperature is less the heating set point and the temperature control baffle is in en intermediate position between full open and full closed, an opening signal is sent to the actuator numeral 670 in accordance with process numerals 1422 and 1415. In either the heating mode numeral 1410 or cooling mode numeral 1411, no signal is sent to actuators referenced by numeral 640 and referenced by numeral 670, thereby maintaining current open position.

Figure 10A:
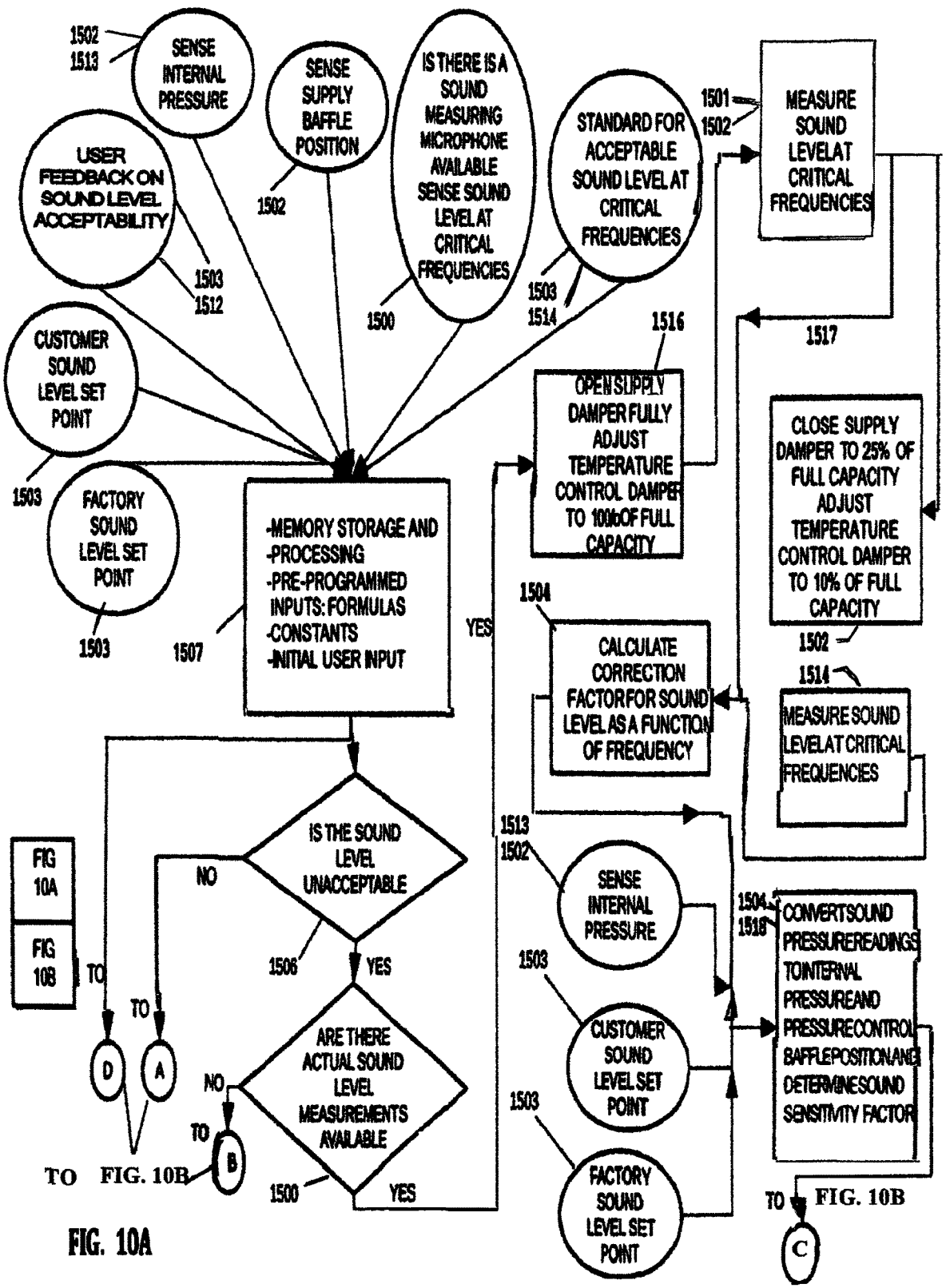
FIG. 10 A is the first drawing of two describing the schematic of the control algorithm for the sensitivity of the air diffuser housing assembly air diffuser housing assembly.
Figure 10B:
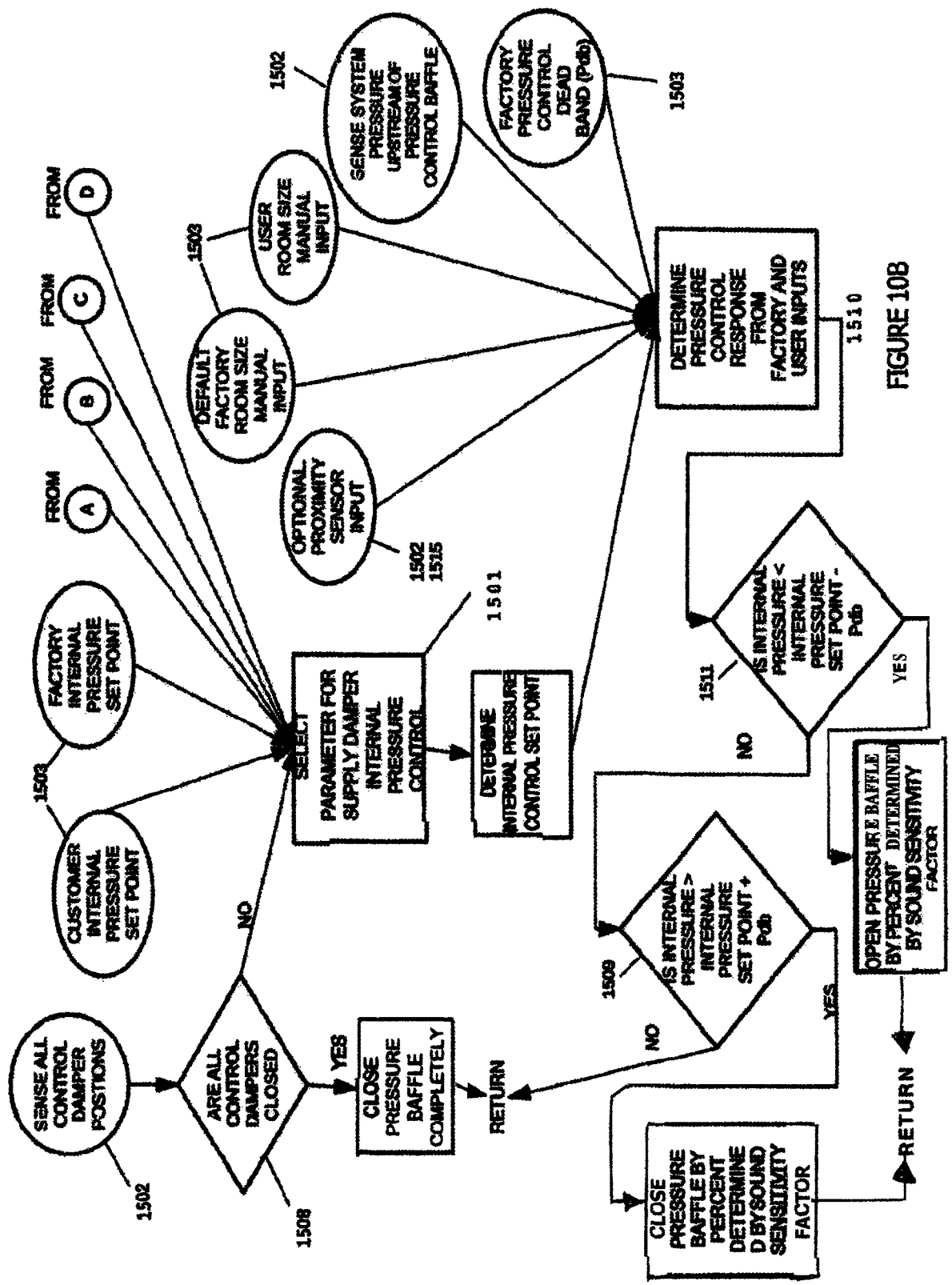

Now referring to FIG. 10A and FIG. 10B which discloses the control operation of the static pressure supply baffle. The first step is to store in memory reference by process numeral 1507 all factory default inputs and user defined inputs referenced by process numeral 1503. All related sensor inputs for pressure referenced by process numeral 1502 are recorded in memory. Determine if there is a microphone input for sound measurements as reference by process numeral 1500. If the sound level is unacceptable as referenced by process numeral 1506, then the customer user set point input referenced by process numeral 1512 initiates recalibration as referenced by process steps 1504, 1513, 1514,1516, and 1517. Recalibration of the relationship between the pressure sensor reading as referenced by process numeral 1513 and microphone sensor referenced by process numeral 1514 is performed as referenced by process numeral 1504. During the recalibration process the static pressure control baffle is repositioned according to process numerals 1516 and 1517. A new relationship between microphone readings and sound rating are recalculated and stored as referenced by process numeral 1507. With all the operational inputs stored, the first step in the control operation is to determine if the temperature control baffle actuator position sensors referenced by numerals 630 and 661 are in the fully closed position. If they are then the pressure control baffle actuator position sensor referenced by numeral 691 is driven to its fully closed position and the program starts over at the next iteration. If the temperature control baffle actuator position sensors are not, then the program continues with process steps referenced by numerals 1501, 1509, 1510, and 1511 to control internal pressure sensor input from internal pressure sensor referenced by numeral 697. If the pressure is above set point the internal supply pressure actuator referenced by numeral 695 is actuated to close the baffle to a position dictated by the control algorithm and measured by pressure actuator position sensor numeral 691 as referenced by process step 1509. If the pressure is below set point the internal supply pressure actuator referenced by numeral 695 is actuated to open the baffle to a position dictated by the control algorithm and measured by pressure actuator position sensor numeral 691 as referenced by process step 1511.

Figure 11:
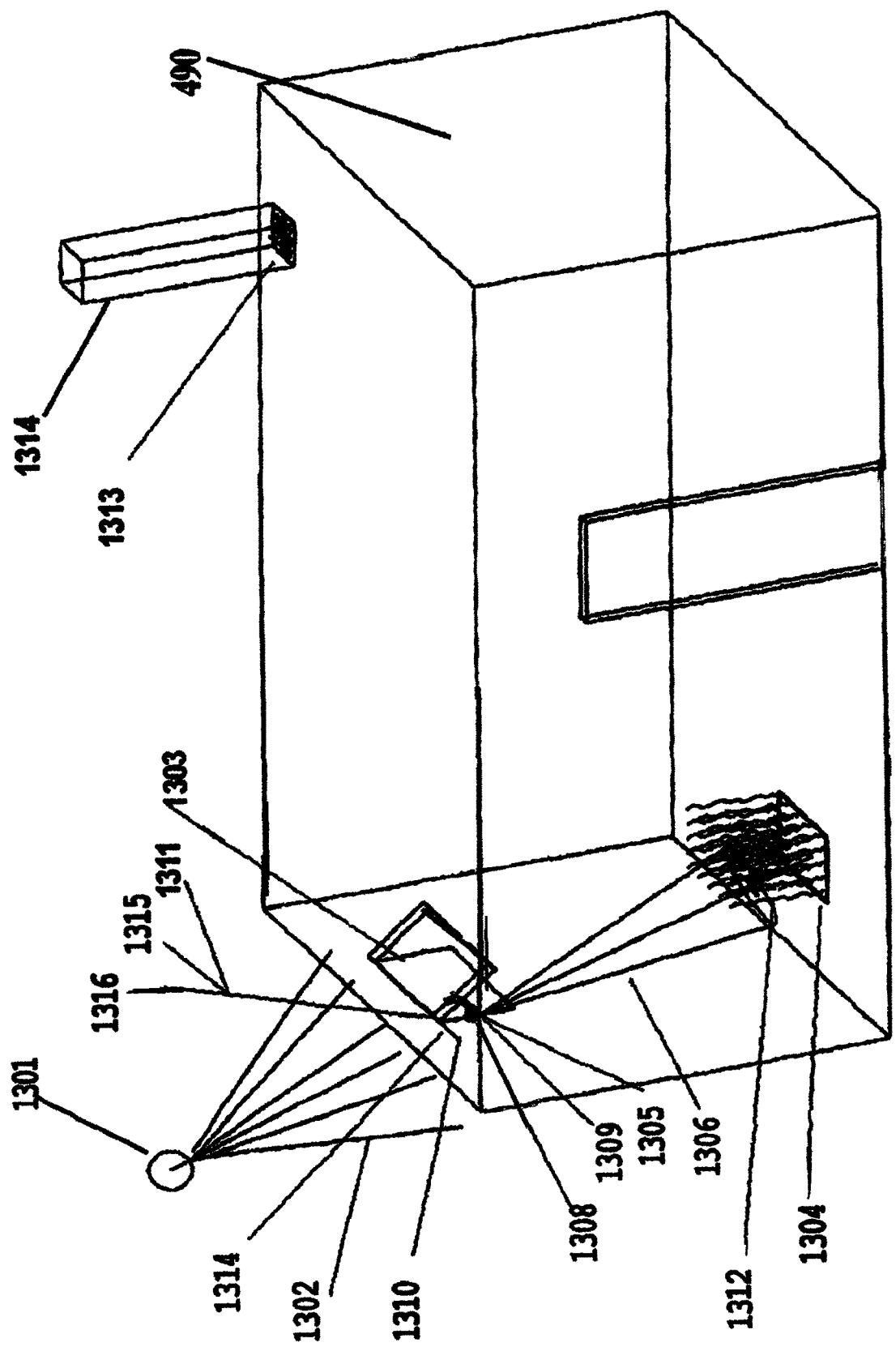
FIG. 11 is a perspective view of an intelligent moveable window/shutter/damper assembly.

Now referring to FIG. 11 which discloses the operation of a smart window. When thermal radiation referenced by numeral 1302 from the sun referenced by numeral 1301 passes through a window referenced by numeral 1303 and heats the floor area within a room referenced by 490 referenced by numeral 1304. The heated air rises as referenced by numeral 1312 rises and raises the temperature within the enclosed space referenced by numeral. An infrared sensor referenced by numeral 1305 with its area of surface temperature measurement referenced by numeral 1306 measures the temperature of the floor area 1304 near the window 1303. If the surface temperature measurement exceeds a preset set point and the outside ambient temperature referenced by numeral 1314 as measured by the ambient air temperature sensor referenced by numeral 1310 is below the set point, the control algorithm within the control module referenced by numeral 1308 sends a signal to the actuator referenced by numeral 1309 to open the window. Cooler air flows into room driven by ambient outside wind or negative pressure within the space. This negative pressure is created by mechanical fans referenced by numeral 1313 or the buoyancy effect of the heated area within the room rises upward through a vertical tower referenced by numeral 1314 to ambient conditions. No power is required for this system as a result of energy harvesting from a thermoelectric module referenced by numeral 1311. The system would include a battery referenced by 1315 or super capacitor referenced by 1316 for energy storage.

Figure 12:
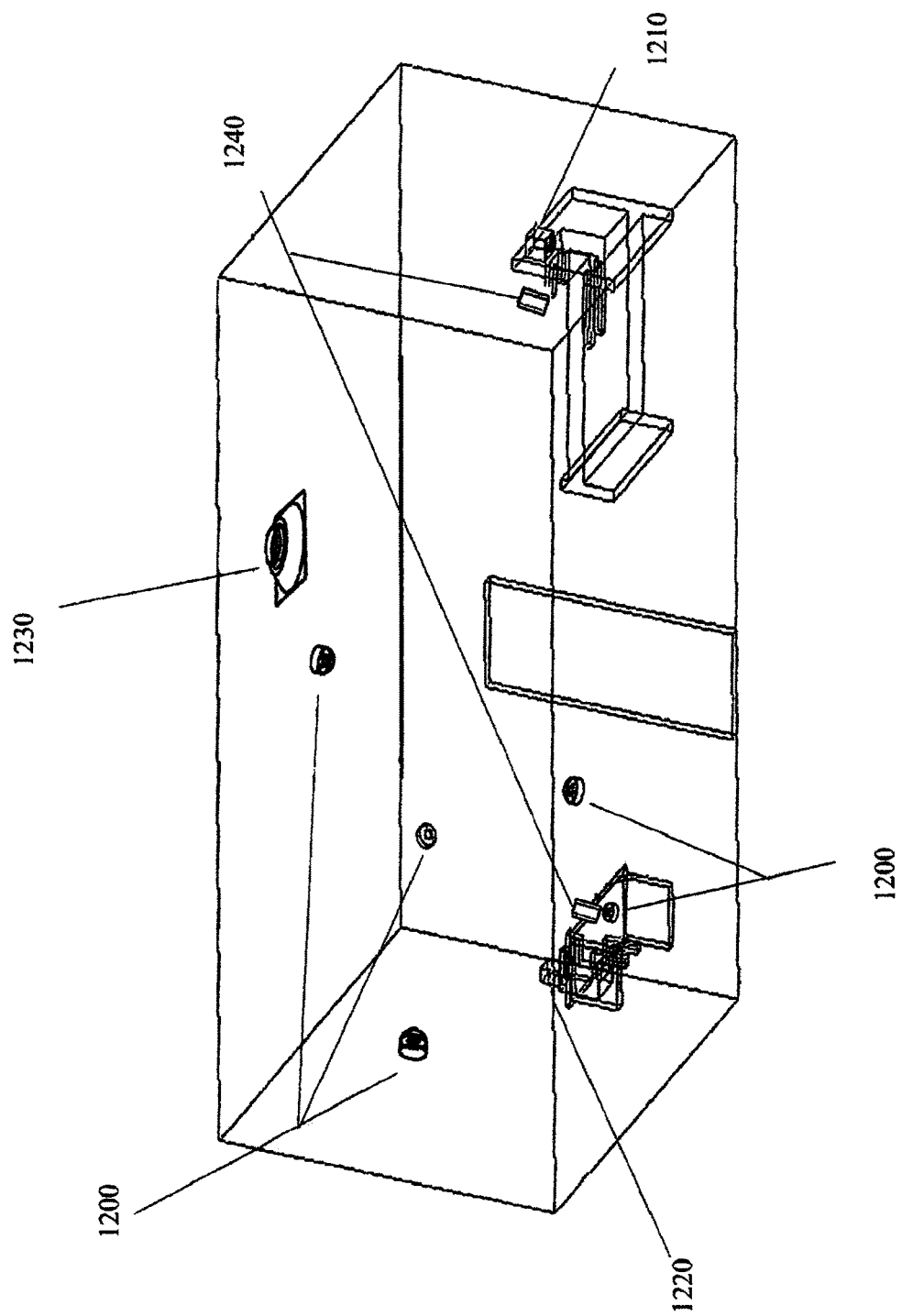
FIG. 12 is a perspective view of the occupied space including user location, infrared sensor locations, a flow control regulator for conditioned air flow control, and a user input device.

Now referring to FIG. 12 which discloses a preferred embodiment of the present invention, a heat transfer analytical control unit comprising infrared sensor unit generally referenced by numeral 1200 which is depicted in a number of possible locations within a closed environment, such as a room or office wherein the unit 1200 has the functionality of the following, it can sense irradiation from objects within the environment, and control the movement of conditioned air for the comfort control for a user referenced by numerals 1210 and 1220, wherein the sensors could also incorporate sensing visible light from objects within the environment, sensing CO2 concentration of the air within the environment for air quality analysis, and sensing distance to physical objects within the environment to supplement heat transfer calculations, and a flow control regulator referenced by numeral 1230 for conditioned air flow and direction control and a user input devices referenced by numeral 1240

Figure 13:
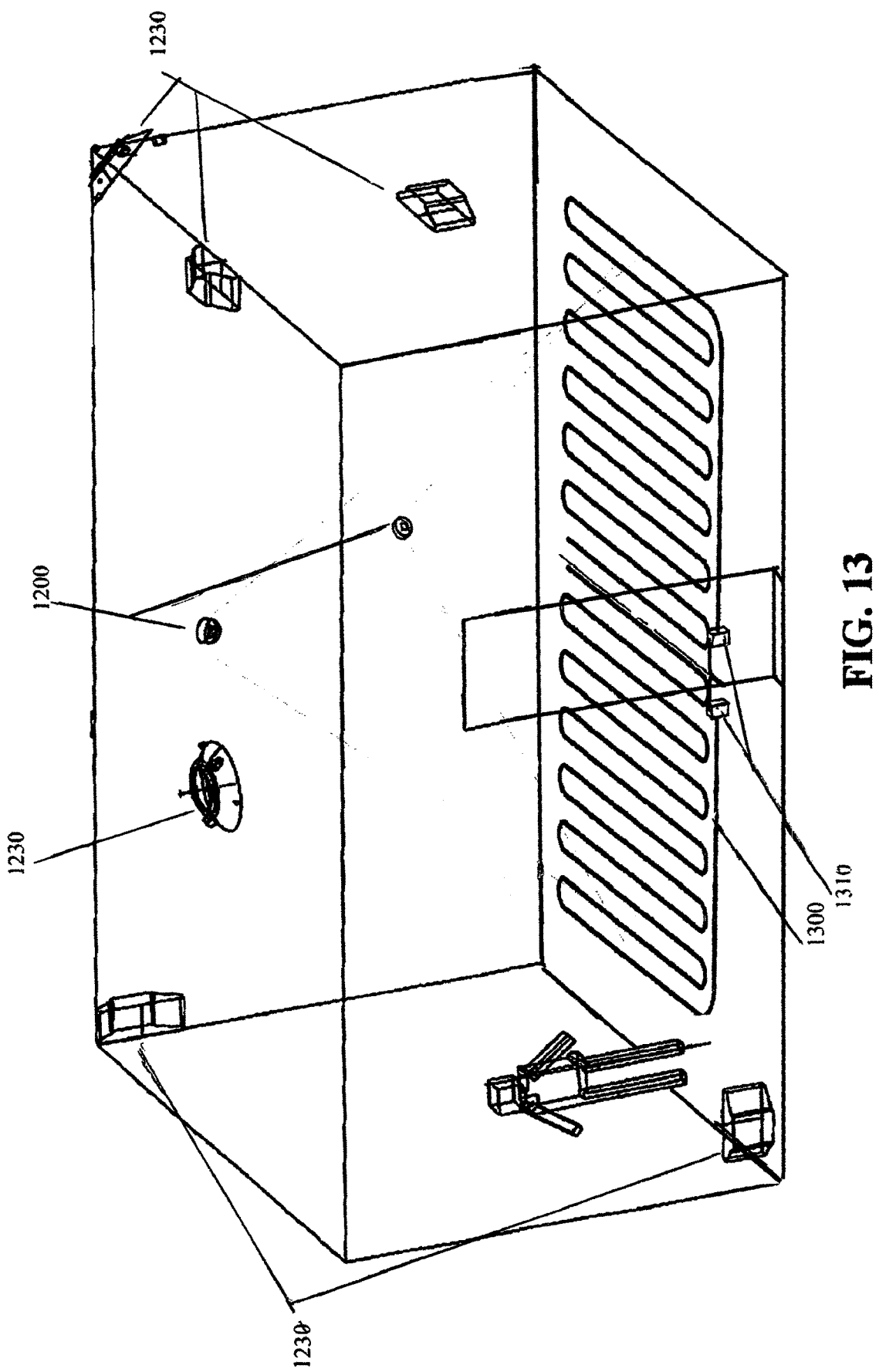
FIG. 13 is a perspective view of other occupied space locations for the flow control regulator enabling conditioned airflow and direction.

Now referring to FIG. 13 which discloses optional locations for the infrared sensors in the ceiling and back wall referenced by numeral 1200, optional locations for the flow control regulator for conditioned air flow control referenced by numeral 1230 include centrally located in the ceiling, at the ceiling/wall corner along a long wall in a rectangular room, at a ceiling/wall corner along a short wall, and at ft an under floor location. Also disclosed is a location for a flow control regulator for conditioned liquid flow referenced by numeral 1310 in a hydronic heating/cooling system referenced by numeral 1300

Figure 14:
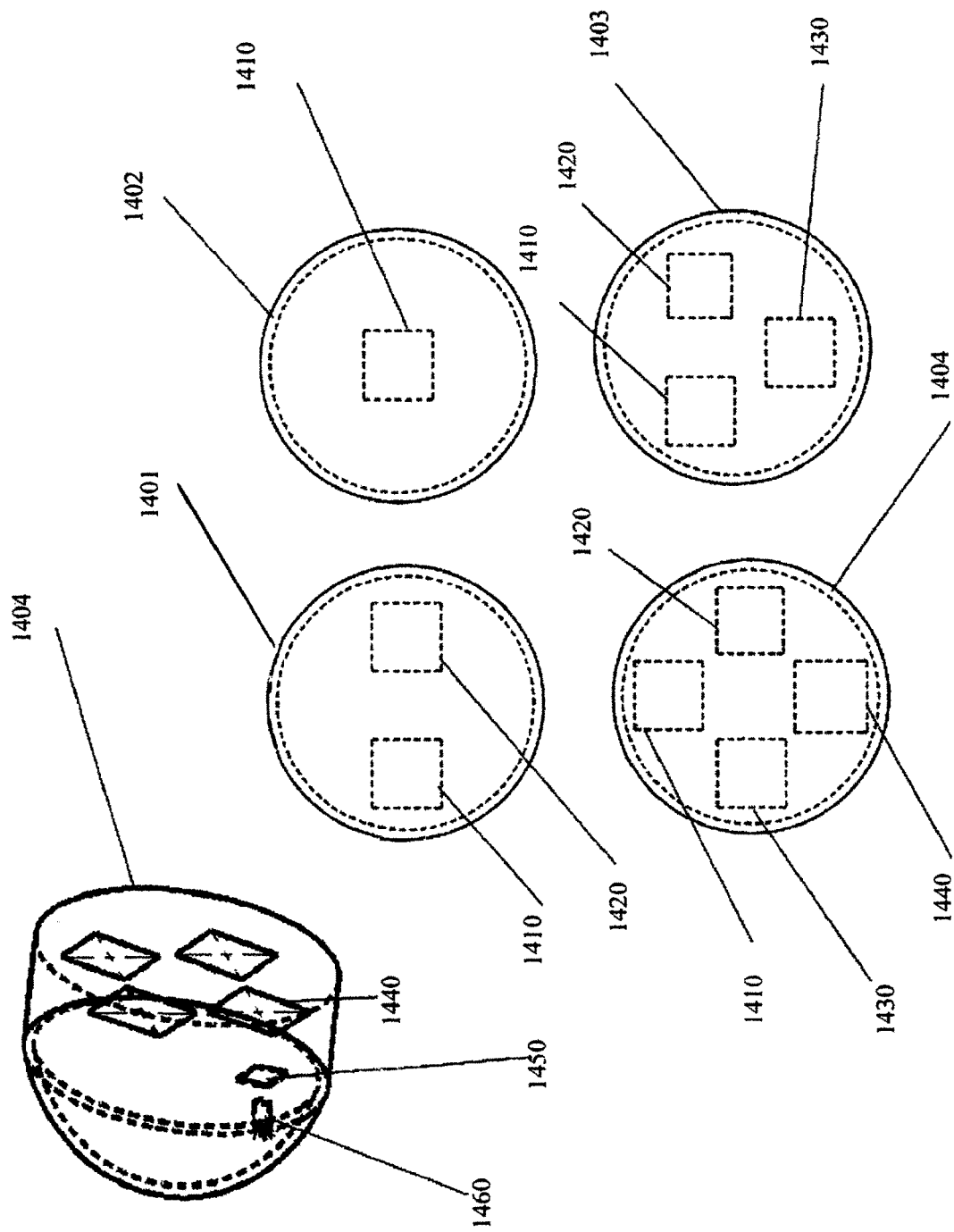
FIG. 14 is a view of the detector options within the infrared sensing unit.

Now referring to FIG. 14 which discloses the options for the infrared radiation sensor with one detector array referenced by numeral 1402 having the function of irradiance detection, and one infrared radiation sensor that has two detectors wherein one detector is a radiance detector referenced by numeral 1401, and one infrared radiation sensor that has three detectors wherein one detector is a radiance detector referenced by numeral 1403, and one infrared radiation sensor that has four detectors wherein one detector is a radiance detector referenced by numeral 1404. Within sensor referenced by numeral 1402, the detector referenced by numeral 1410 has the function of irradiance detection or any combination of irradiance detection plus additional functions of any combination of visible light detection, CO2 concentration detection, and object distance detection. Within sensor referenced by numeral 1401, the detector referenced by numeral 1410 has the function of irradiance detection and detector referenced by numeral 1420 has any combination of functions of irradiance detection, visible light detection, CO2 concentration detection, and object distance detection. Within sensor referenced by numeral 1403, the detector referenced by numeral 1410 has the function of irradiance detection and detector referenced by numeral 1420 has any combination of functions of irradiance detection, visible light detection, CO2 concentration detection, and object distance detection, and detector referenced by numeral 1430 has any combination of functions of irradiance detection, visible light detection. CO2 concentration detection, and object distance detection. Within sensor referenced by numeral 1404, the detector referenced by numeral 1410 has the function of irradiance detection and detector referenced by numeral 1420 has any combination of functions of irradiance detection, visible light detection, CO2 concentration detection, and object distance detection, and detector referenced by numeral 1430 has any combination of functions of irradiance detection, visible light detection, CO2 concentration detection, and object distance detection, and detector referenced by numeral 1440 has any combination of functions of irradiance detection, visible light detection. CO2 concentration detection, and object distance detection. The perspective view of sensor option referenced by numeral 1400 shows components of CO2 concentration detection with a infrared emitter referenced by numeral 1460 and a CO2 radiation filter referenced by numeral 14SO and a CO2 concentration detector referenced by numeral 1440.

Figure 15:
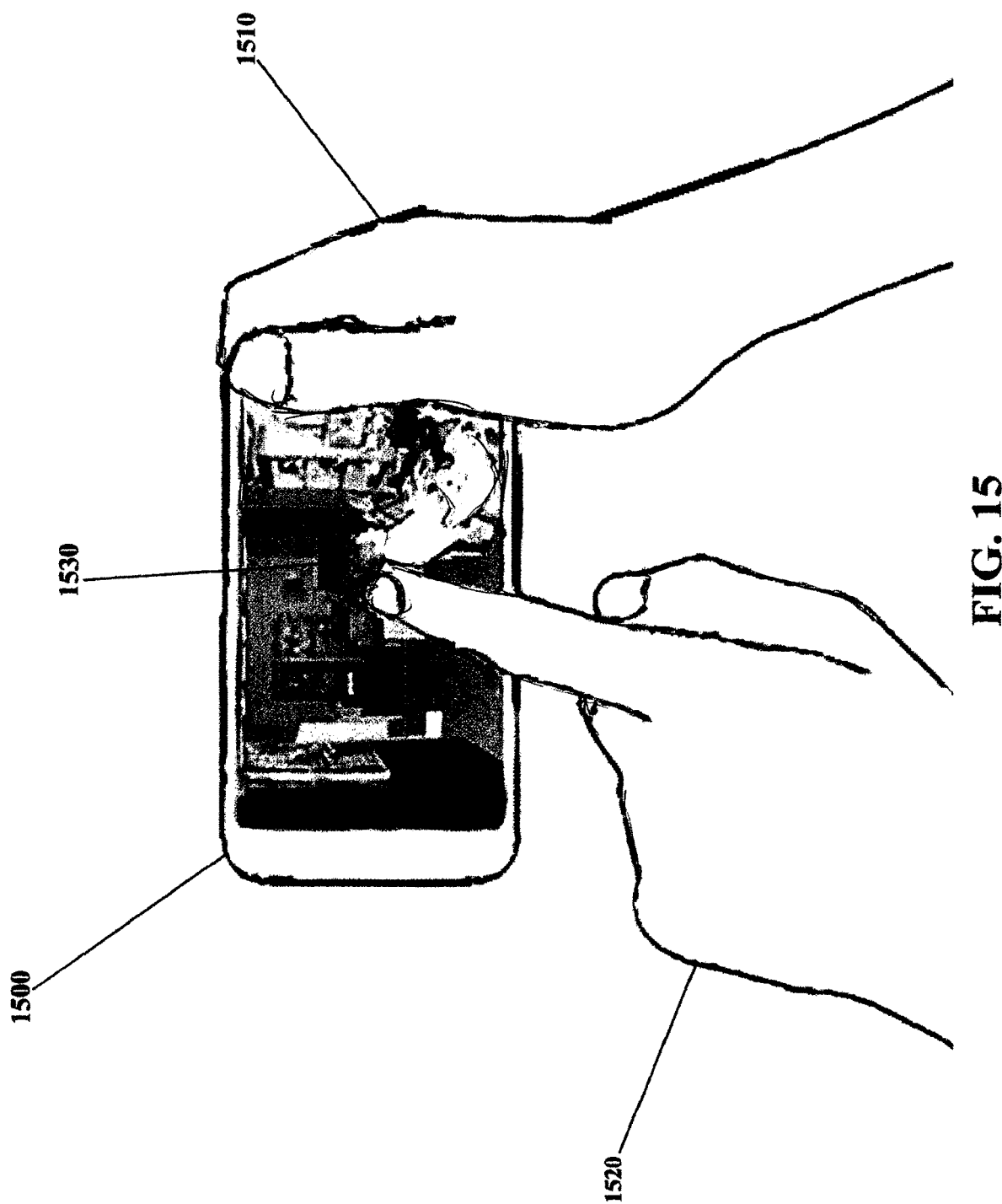
FIG. 15 is a simulated view of a user selecting a focus within the area of interest and to activate thermal control within the selected area of the thermal image on the user input device.

Now referring to FIG. 15 which discloses the infrared image of a user working at a desk in the area of detection reference by numeral 1530 on a hand held user input device referenced by numeral 1520. The user finger referenced by numeral 1510 is shown selecting the focus within the area of detection for comfort control with the other hand referenced by numeral 1500 holding the user input device.

Figure 16:
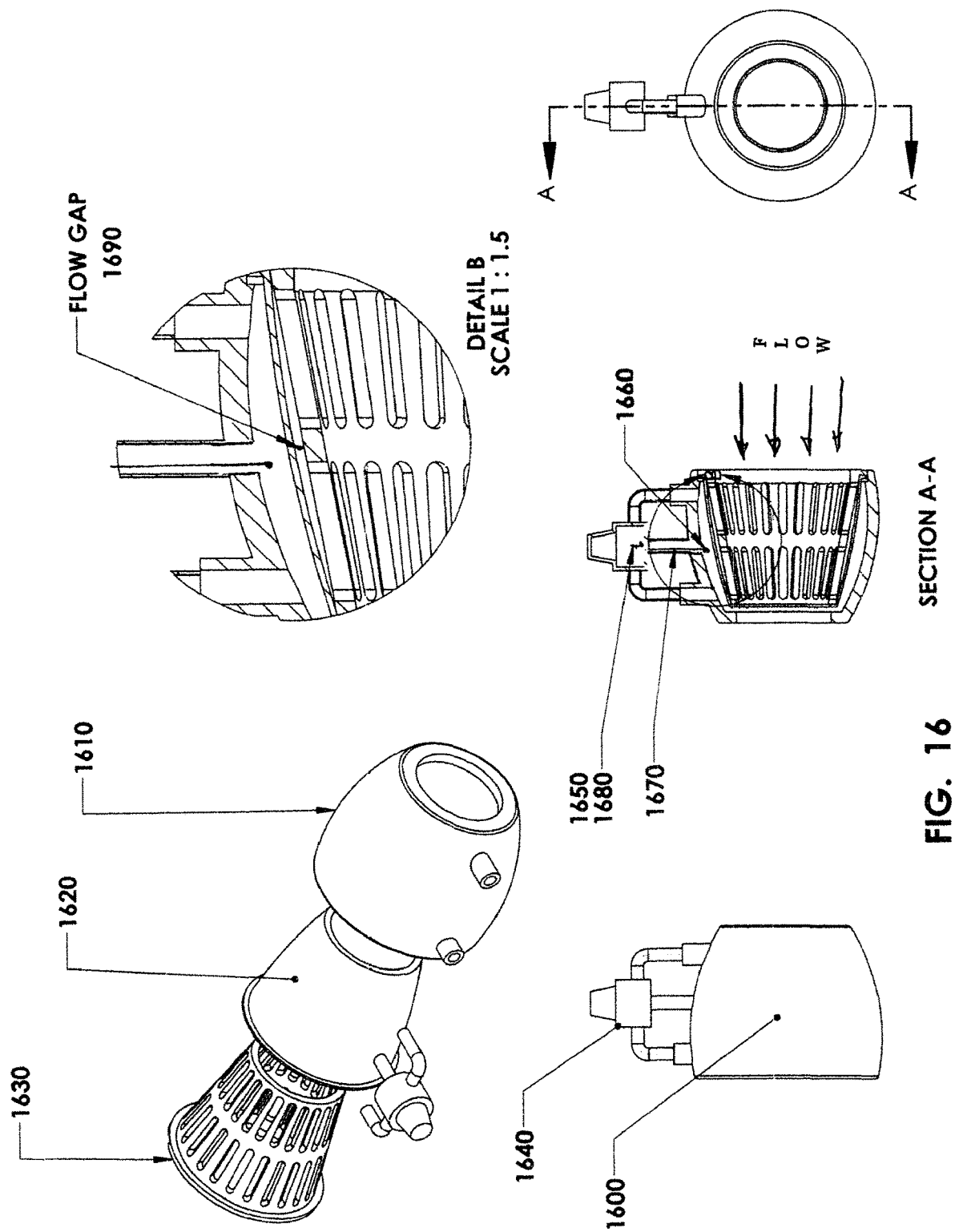
FIG. 16 is a multiple detail view of an inline design for the flow control regulator usable underground, above ground, outside a structure, inside a structure, within the structure shown in exploded, perspective.

Now referring to FIG. 16 which discloses discloses the one possible internal construction of the flow control regulator referenced by numeral 1600 Internal components include an internal sensing element referenced by numeral 1650 for communication with the electronic control assembly, a flexible throttling element referenced by numeral 1620, a pressure actuator referenced by number 1640 for moving the said flexible throttling element, an internal temperature sensor referenced by number 1660, an internal pressure sensor referenced by numeral 1680 with a tube referenced by numeral 1670 to communicate internal pressure to said pressure sensor, and the housing for the complete assembly referenced by numeral 1610, whereby pressure actuator referenced by numeral 1640 moves flexible throttling element referenced by numeral 1620 thereby creating a flow gap referenced by numeral 1690 allowing passage of fluid flow through internal flow structure referenced by numeral 1630

Figure 17:
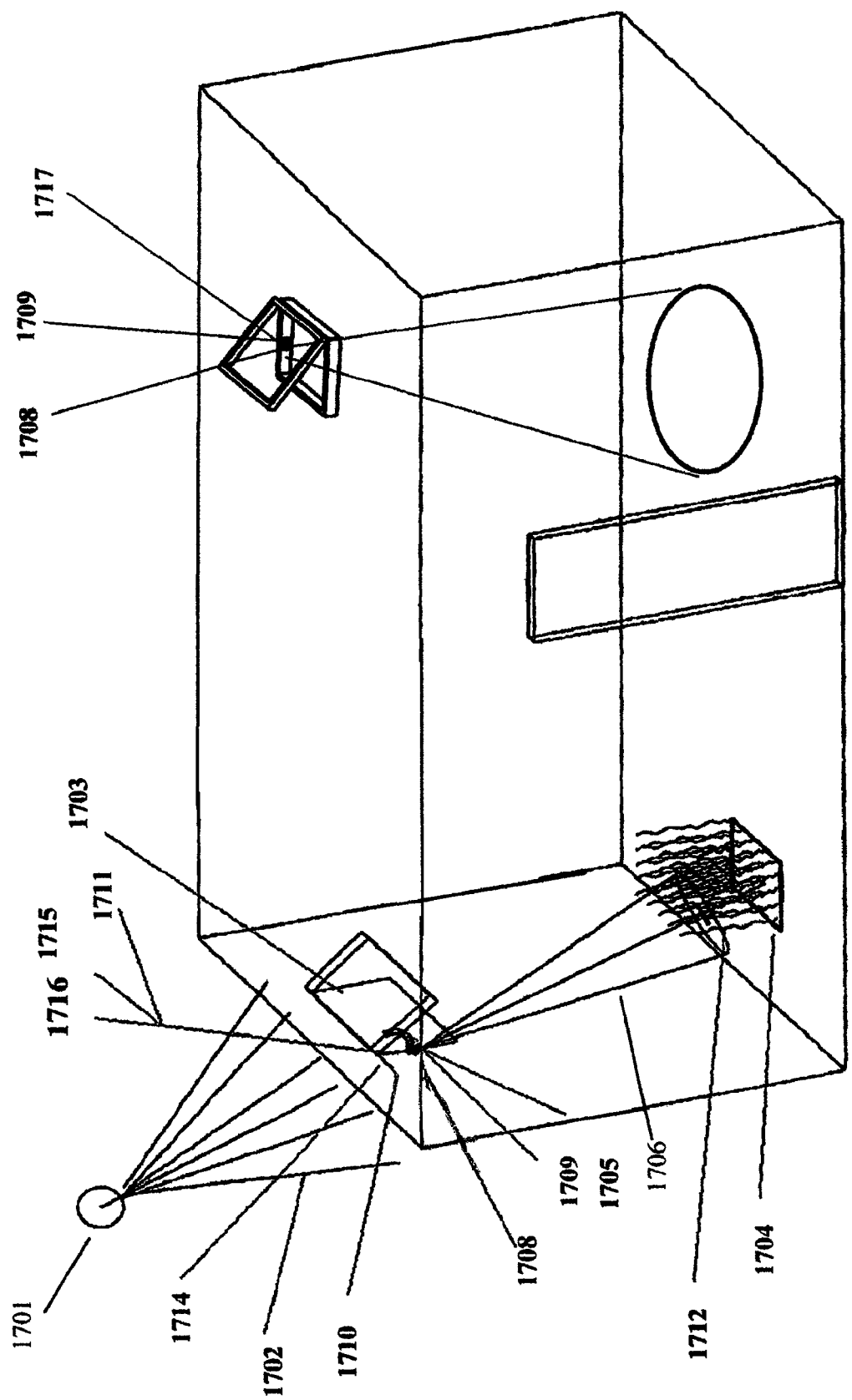
FIG. 17 is a perspective view of the occupied space including an intelligent moveable window assembly and an intelligent moveable skylight assembly

Now referring to FIG. 17 which discloses the operation of a smart window and smart skylight. When thermal radiation referenced by numeral 1702 from the sun referenced by numeral 1701 passes through a window referenced by numeral 1703 and heats the floor area within a room referenced by numeral 1704. The heated air rises as referenced by numeral 1712 rises and heats the enclosed space An infrared sensor referenced by numeral 1705 with its area of surface irradiance measurement referenced by numeral 1706 measures the irradiance of the floor area 1704 near the window 1703. If the surface irradiance measurement exceeds a preset set point and the outside ambient temperature referenced by numeral 1714 as measured by the ambient air temperature sensor referenced by numeral 1710 is below the set point, the control algorithm within the electronic control unit referenced by numeral 1708 sends a signal to the actuator referenced by numeral 1709 to open the window. Cooler air flows into room driven by ambient outside wind or negative pressure within the space. This negative pressure is created by the buoyancy effect of the heated area within the room rises upward through a skylight referenced by numeral 1717 to ambient conditions. The skylight shown is smart skylight wherein the radiation sensor referenced by 1708 measures the irradiance of the floor area below the skylight and sends a signal to the actuator referenced by numeral 1709 to open the skylight. the smart window and smart skylight work cooperatively to provide cool ambient air to enter through the window and exhaust the warm air thru the skylight. No power is required for this system as a result of energy harvesting from a thermoelectric module referenced by numeral 1711. The system would include a battery referenced by 1715 or super capacitor referenced by 1716 for energy storage.

The invention claimed is:

1. A Spatial Environmental Control Unit comprising:
 a regulator assembly comprising a flow control regulator comprising a housing, a fluid flow gap, and a moveable flow baffle assembly comprising at least one baffle plate, and at least one bearing; whereby said housing, said fluid flow gap and said moveable flow baffle assembly form said flow control regulator;
 said regulator assembly further comprising an actuator connected to said flow control regulator and configured to control said flow control regulator; and
 an electronic control assembly comprising an electronic control unit in communication with said regulator assembly and at least one multi-spectral, multi-pixel infrared radiation sensor; whereby said at least one multi-spectral, multi-pixel infrared radiation sensor is configured to scan objects in a spatial area and calculate thermal properties of said objects and heat transfer between said objects in two or three dimensions;
 whereby said actuator is configured to engage and adjust said moveable flow baffle assembly creating said fluid flow gap;
 whereby said at least one multi-spectral, multi-pixel infrared radiation sensor communicates said thermal properties and said heat transfer to said electronic control unit; whereby said electronic control unit adjusts said flow gap based on said thermal properties and said heat transfer.

2. The Spatial Environmental Control Unit of claim 1, wherein said at least one multi-spectral, multi-pixel infrared radiation sensor communicates at least one thermal image of said objects in said spatial area in two or three dimensions for visual analysis of at least one of the following: a) said thermal properties of said objects, b) said heat transfer between said objects and c) fluid movement from said fluid flow gap in said spatial area.

3. The Spatial Environmental Control Unit of claim 2, further comprising at least one optical sensor for visible light detection; whereby said at least one optical sensor is configured to scan said objects in said spatial area for at least one visible light image in two or three dimensions; whereby said at least one visible light image and said at least one thermal image can be viewed separately or superimposed.

4. The Spatial Environmental Control Unit of claim 1, wherein said flow control regulator is mounted within or proximate to a room in at least one of the following: a) a ceiling: b) a wall; c) a floor: d) under a floor; e) above a ceiling: and f) inside a wall, and wherein said electronic control assembly is mounted within said room in at least one of the following: a) a ceiling; b) a wall; and c) a floor.

5. The Spatial Environmental Control Unit of claim 1 wherein said Spatial Environmental Control Unit is powered by an energy supply comprising: a device implementing energy harvesting techniques, a battery or a super capacitor.

6. A Spatial Environmental Control Unit comprising:
   a regulator assembly comprising a flow control regulator comprising a housing, a flexible throttling element and a fluid flow gap whereby said housing, said flexible throttling element and said fluid flow gap form said flow control regulator;
   said regulator assembly further comprising an actuator connected to said flow control regulator and configured to control said flow control regulator; and
   an electronic control assembly comprising an electronic control unit in communication with said regulator assembly, and at least one multi-spectral, multi-pixel infrared radiation sensor; whereby said at least one multi-spectral, multi-pixel infrared radiation sensor is configured to scan objects in a spatial area and calculate thermal properties of said objects and heat transfer between said objects in two or three dimensions;
   whereby said actuator is configured to engage and adjust said flexible throttling element creating said fluid flow gap;
   whereby said at least one multi-spectral, multi-pixel infrared radiation sensor communicates said thermal properties and said heat transfer to said electronic control unit whereby said electronic control unit adjusts said fluid flow gap based on said thermal properties and said heat transfer.

7. The Spatial Environmental Control Unit of claim 6, wherein said at least one multi-spectral, multi-pixel infrared radiation sensor communicates at least one thermal image of said objects in said spatial area in two or three dimensions for visual analysis of at least one of the following: a) said thermal properties of said objects, b) said heat transfer between said objects and c) fluid movement from said fluid flow gap in said spatial area.

8. The Spatial Environmental Control Unit of claim 7, further comprising at least one optical sensor for visible light detection; whereby said at least one optical sensor is configured to scan said objects in said spatial area for at least one visible light image in two or three dimensions; whereby said at least one visible light image and said at least one thermal image can be viewed separately or superimposed.

9. A Spatial Environmental Control Unit comprising:
   a regulator assembly comprising a flow control regulator comprising a housing, a flexible throttling element and a fluid flow gap whereby said housing, said flexible throttling element, and said fluid flow gap form said flow control regulator;
   said regulator assembly further comprising an actuator connected to said flow control regulator and configured to control said flow control regulator, and an electronic control assembly comprising an electronic control unit in communication with said regulator assembly;
   and at least one infrared radiation sensor measuring thermal properties of at least one object in a spatial area for temperature calculations; whereby said actuator is configured to engage and adjust said flexible throttling element creating said fluid flow gap;
   whereby said at least one infrared radiation-sensor communicates said thermal properties to said electronic control unit; whereby said electronic control unit adjusts said fluid flow gap based on a comparison of said temperature calculations of said at least one object in said spatial area to a threshold temperature.

\* \* \* \* \*